(12) United States Patent
Ochiai et al.

(10) Patent No.: US 7,099,568 B2
(45) Date of Patent: Aug. 29, 2006

(54) INFORMATION PLAYBACK APPARATUS AND ELECTRONIC POP ADVERTISING APPARATUS

(75) Inventors: Yoshio Ochiai, Saitama (JP); Yasufumi Shinagawa, Saitama (JP); Koni Saito, Tokyo (JP)

(73) Assignee: Sony Corporation, (JP)

( * ) Notice: Subject to any disclaimer, the term of this patent is extended or adjusted under 35 U.S.C. 154(b) by 1004 days.

(21) Appl. No.: 09/810,014

(22) Filed: Mar. 16, 2001

(65) Prior Publication Data

US 2001/0036353 A1    Nov. 1, 2001

(30) Foreign Application Priority Data

| Mar. 21, 2000 | (JP) | ............................. P2000-078460 |
| Oct. 6, 2000 | (JP) | ............................. P2000-308322 |

(51) Int. Cl.
*H04N 5/85* (2006.01)
(52) U.S. Cl. ........................................ 386/125; 386/126
(58) Field of Classification Search ................ 386/125, 386/46, 124, 109, 111, 112, 27, 33, 45, 105, 386/106, 107, 117, 40, 94, 95
See application file for complete search history.

(56) References Cited

U.S. PATENT DOCUMENTS

| 5,270,829 | A | * | 12/1993 | Yang | ............................. | 386/83 |
| 5,499,018 | A | * | 3/1996 | Welmer | ....................... | 340/3.51 |
| 5,710,813 | A | * | 1/1998 | Terui et al. | ................... | 380/275 |
| 6,467,005 | B1 | * | 10/2002 | Ito et al. | ....................... | 713/201 |
| 6,674,468 | B1 | * | 1/2004 | Hosoe et al. | ............. | 348/231.6 |
| 6,847,777 | B1 | * | 1/2005 | Nakamura | ..................... | 386/46 |
| 2003/0210898 | A1 | * | 11/2003 | Juen et al. | ................... | 386/117 |

FOREIGN PATENT DOCUMENTS

JP    02000231757 A  *  8/2000

* cited by examiner

*Primary Examiner*—Robert Chevalier
(74) *Attorney, Agent, or Firm*—Lerner, David, Littenberg, Krumholz & Mentlik, LLP

(57) ABSTRACT

An information playback apparatus includes a storage memory removably attached to a main unit and in which compressed moving image file data are electrically stored; an MPEG decoder in the main unit for reading the data and decompressing it; an NTSC encoder in the main unit for converting playback image data obtained by decompressing the moving image file data into image data in a predetermined output format; an LCD on the main unit or outside of the main unit for displaying the image data in a predetermined display area; and a microcomputer for repeatedly playing back the image data in predetermined units of the compressed moving image file data. An electronic point of purchase (POP) advertising apparatus includes a sensor unit including a sensor for detecting a person and also includes an electronic advertising unit capable of presenting a predetermined POP advertisement in response to detection by the sensor unit. The electronic advertising unit includes a section for storing POP advertisements, a section for selecting a particular POP advertisement of the POP advertisements stored, and a section for outputting the particular POP advertisement in response to a detection signal output from the sensor unit. The electronic POP advertising apparatus is formed to have high reliability and a small size, and is capable of presenting a properly selected POP advertisement in an effective manner in response to detection of a person present near a location where an article is placed.

13 Claims, 23 Drawing Sheets

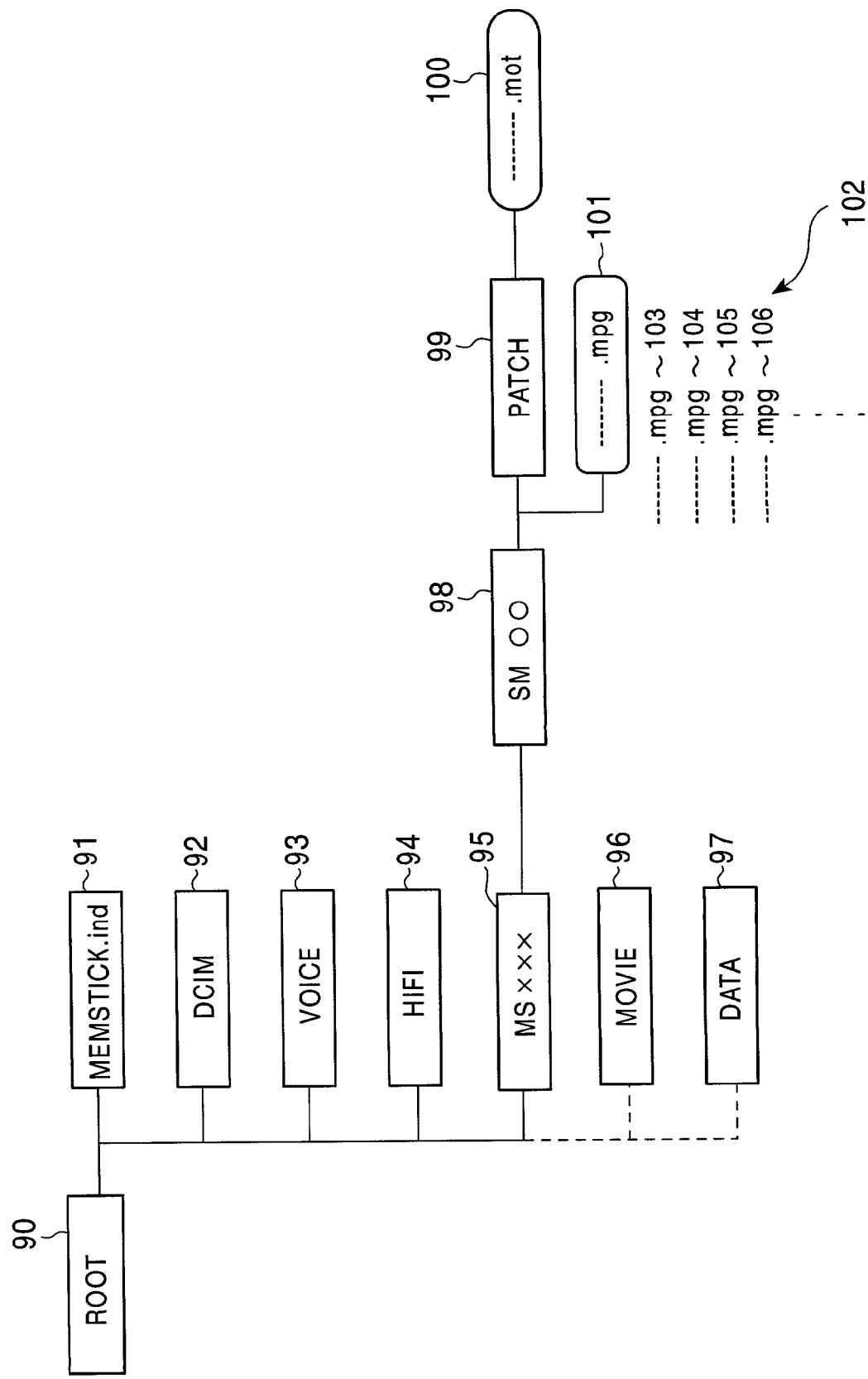

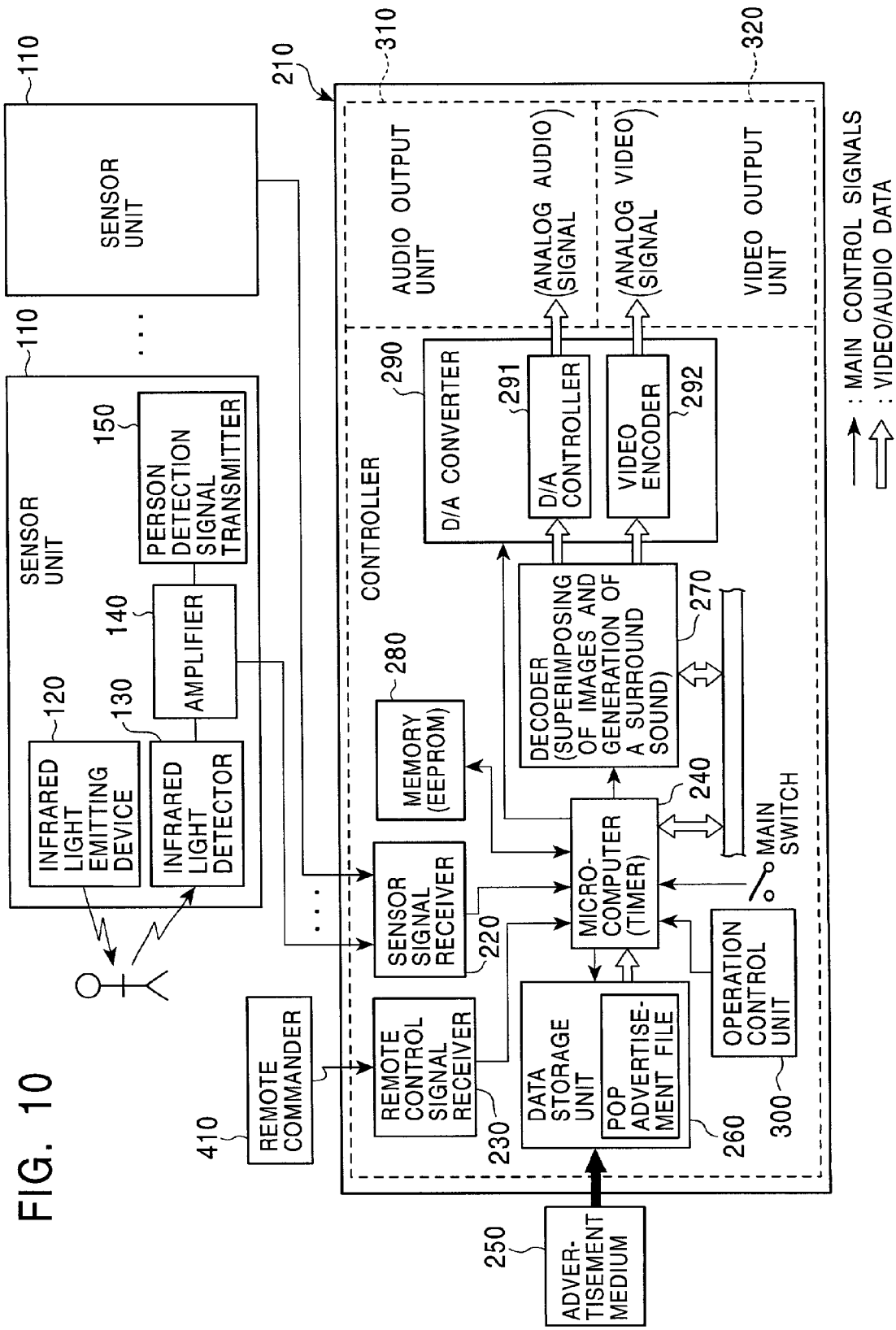

INFORMATION PLAYBACK APPARATUS AND ELECTRONIC POP ADVERTISING APPARATUS

BACKGROUND OF THE INVENTION

1. Field of the Invention

The present invention relates to an information playback apparatus capable of playing back a file stored in a storage medium for storing a file and also to an electronic POP (Point Of Purchase) advertising apparatus including no movable mechanism. More particularly, the present invention relates to an electronic POP advertising apparatus for outputting a preselected POP advertisement in response to detection of presence of a person.

2. Description of the Related Art

In recent years, there has been developed a technique of storing data such as computer data, video data, and audio data in a small-sized storage medium including a solid-state storage device such as a flash memory and reproducing the data using a dedicated driver or a drive installed in an audio/visual device or other types of information devices.

A POP advertising apparatus is known which detects presence of a person using a built-in sensor of a type which detects reflected light or a type which detects light being blocked and which presents, in response to detection of a person, a POP advertisement to the detected person by displaying an image on a display such as a television monitor or a plasma display and outputting a voice.

In the conventional apparatus using the flash memory as the storage medium, it is only possible to store and read still image information into and from the flash memory, moving image information is not allowed to be stored or read into or from the flash memory.

In the apparatus using a tape as the storage medium, deterioration of the tape occurs with age. Another problem of this type of apparatus is that because data is continuously recorded along a tape, it is required to rewind the tape to retrieve data.

In the apparatus using a tape or a video compact disc (video CD) as the storage medium, information is magnetically recorded, and thus a dedicated magnetic recording head is needed. Furthermore, a moving mechanism used to read data wears with time.

Furthermore, in the apparatus using a tape or a video CD as the storage medium, the storage medium has a large size and thus a large space is necessary to keep the storage medium. The apparatus also becomes large in size corresponding to the large size of the storage medium.

In the conventional POP advertising apparatus which presents a POP advertisement in response to detection of presence of a person, because a sensor disposed inside the main unit of the apparatus is used to detect a person, only a person present near the main unit can be detected. Depending upon the detection sensitivity, a person has passed by the POP advertising without seeing a POP advertisement apparatus before starting the advertisement.

Furthermore, an advertisement having a fixed content is prepared in advance, and the fixed advertisement is presented in response to detection of a person. When it is desired to present a different advertisement, it is necessary to replace the current content with a new content. This is very inconvenient.

Although the purpose of the POP advertisement is to present it to persons, the POP advertising apparatus operates even when there is no person. Such a useless operation results in a waste of power consumption.

In the case where the electric power is turned on and off using a sensor timer, there is a possibility that a POP advertisement is switched when the POP advertisement is being presented, and the current POP advertisement is stopped or another different advertisement is started.

In view of the above problems, it is an object of the present invention to provide an electronic POP advertising apparatus having a small size and high reliability in playing back data, and having no moving mechanism.

It is another object of the present invention to provide an electronic POP advertising apparatus which presents a POP advertisement in response to detection of presence of a person and which has a plurality of POP advertisements which can be selected as required. It is still another object of the present invention to provide an electronic POP advertising apparatus capable of presenting a POP advertisement without terminating the operation before the end of the advertisement is reached.

SUMMARY OF THE INVENTION

According to an aspect of the present invention, there is provided an information playback apparatus including a plate-shaped storage medium which is removably attached to a main unit and in which particular compressed moving image file data is electrically stored.

The information playback apparatus further includes decompressing means disposed in the main unit, for reading the compressed moving image file data and decompressing it; conversion means disposed in the main unit, for converting playback image data obtained by decompressing the moving image file data into image data in a predetermined output format; displaying means disposed on the main unit or in the outside of the main unit, for displaying the image data in the predetermined output format in a predetermined display area; and controlling means for repeatedly playing back the image data in predetermined units of the compressed moving image file data.

According to another aspect of the present invention, there is provided an electronic POP advertising apparatus comprising: a sensor unit including a sensor for detecting a person; and an electronic advertising unit capable of presenting a predetermined POP advertisement in response to detection by the sensor unit, wherein said electronic advertising unit includes: means for storing a plurality of POP advertisements; means for selecting a particular POP advertisement of the POP advertisements stored; and means for outputting the particular POP advertisement in response to a detection signal output from the sensor unit.

In this electronic POP advertising apparatus, the POP advertisement is preferably presented by displaying an image or by outputting a voice or sound.

Preferably, the means for outputting the POP advertisement starts a POP advertisement outputting operation when the sensor detects a person and ends the operation after presenting a unit of POP advertisement described in a file a predetermined arbitrary number of times.

Preferably, the sensor unit transmits the signal according to the same scheme as that employed by a remote controller for controlling the electronic advertising unit.

Preferably, the sensor unit is formed separately from the electronic advertising unit.

Preferably, a plurality of the sensor units are formed separately from the electronic advertising unit and the plurality of sensor units are disposed at different locations, and the content of the POP advertisement presented by the electronic advertising unit is changed depending upon which of the plurality of sensor units a person is detected by.

Preferably, the content of the POP advertisement presented by the electronic advertising unit is changed such that the audio output of the POP advertisement is changed depending upon the location where the sensor unit is disposed.

Preferably, the content of the POP advertisement presented by the electronic advertising unit is changed depending upon a period of time in which a person is detected by the sensor unit.

Preferably, the sensor is a reflective-type infrared sensor, a pyroelectric-type infrared sensor, a mechanical switch, or a photosensor, or a combination of two or more of these sensors.

Preferably, the displaying screen of the electronic advertising unit is formed of a liquid crystal display screen, and a panel case for protecting the liquid crystal display screen from a pressing force is disposed on the front side of the liquid crystal display screen.

Preferably, the electronic advertising unit is coupled with a fixing member for fixing the electronic advertising unit, wherein the fixing member includes a removal protection part for preventing a power cable terminal and a signal cable terminal from being removed from the electronic advertising unit.

The above-described information playback apparatus operates as follows.

The control means reads compressed image data and compressed audio data stored in the plate-shaped storage medium. The obtained compressed image data and compressed audio data are supplied to the decompressing means. The decompressing means decompresses the compressed image data thereby producing reproduced image data and also decompresses the compressed audio data thereby producing reproduced audio data.

The image data reproduced by the decompressing means is supplied to the conversion means. The conversion means converts the received image data into a video output signal in the form of a composite signal. The audio data reproduced by the decompressing means is also supplied to the conversion means and converted into an analog audio output signal.

The video output signal in the form of the composite signal is supplied to the displaying means and displayed thereon. The video signal is repeatedly reproduced in predetermined units in accordance with the compressed moving image file data.

As described above, a POP advertisement is presented when presence of a person is detected. That is, a POP advertisement is presented only when it is necessary, and thus a reduction in power consumption is achieved. Furthermore, by disposing the sensor properly apart from the main unit, it becomes possible to present a POP advertisement in response to a movement of a person.

BRIEF DESCRIPTION OF THE DRAWINGS

FIG. 9 is a schematic diagram illustrating directories of a plate-shaped semiconductor memory;

FIG. 10 is a block diagram generally illustrating the configuration of an electronic POP advertising apparatus according to a first embodiment of the present invention;

DESCRIPTION OF THE PREFERRED EMBODIMENTS

Preferred embodiments of the present invention are described below. In an information playback apparatus according to an embodiment of the present invention, a plate-shaped semiconductor memory is employed as a storage medium, and compressed image file is repeatedly reproduced from the plate-shaped semiconductor memory.

Configuration of Information Playback Apparatus

Figure 1:
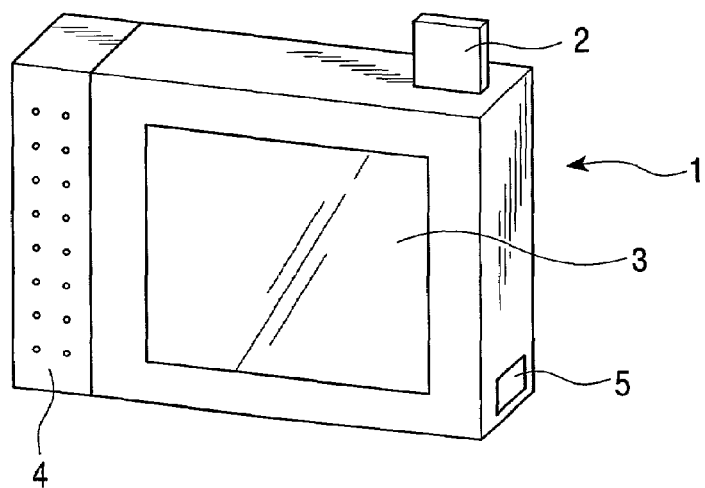
FIG. 1 is a diagram illustrating the external appearance of an information playback apparatus according to an embodiment of the present invention.

Referring to FIG. 1, the configuration of an information playback apparatus according to an embodiment of the present invention is described below.

FIG. 1 illustrates the external appearance of the information playback apparatus 1 capable of reading data from the plate-shaped semiconductor memory, which will be described later, and displaying information according to the data read from the plate-shaped semiconductor memory. An information playback system is formed of the information playback apparatus 1 and the plate-shaped semiconductor memory 2 shown in FIG. 1.

The plate-shaped semiconductor memory 2 is installed into the information playback apparatus 1 such that a terminal part of the plate-shaped semiconductor memory 2 is brought into contact with an attachment mechanism disposed on, for example, the upper surface of the information playback apparatus 1.

The information playback apparatus 1 is formed in the shape of a thin plate. An LCD (Liquid Crystal Display) 3 for displaying an image is disposed on the front surface of the information playback apparatus 1, and a speaker 4 is disposed in an end portion thereof. An external output terminal 5 is disposed on the opposite end face.

In the specific example of the information playback apparatus 1 shown in FIG. 1, the LCD 3 and the speaker 4 are disposed integrally with the main unit. However, the LCD and/or the speaker may be disposed in the outside and may be connected via a cable to the external output terminal 5 of the information playback apparatus 1. The LCD 3 may be of a 4-inch type LCD.

The information playback apparatus 1 can deal with various types of main data to be repeated played back from the plate-shaped semiconductor memory 2. They include compressed moving image data, audio data (hereinafter also referred to as voice data), HiFi audio data (hereinafter also referred to as music data), and control data. Besides, still image data may also be dealt with.

In the present embodiment, for simplicity, the information playback system is assumed to play back main data including compressed moving data and compressed audio data (voice data). However, of course, other types of data such as a still image or music data may also be played back if the information playback apparatus 1 includes an input/output system and a processing system for dealing with such data.

In the information playback apparatus according to the present embodiment, advertisement moving image data can be repeatedly reproduced from the compressed image data stored in the plate-shaped semiconductor memory. Furthermore, as described later, it is possible to replace data or a control program for a particular apparatus.

Figure 2:
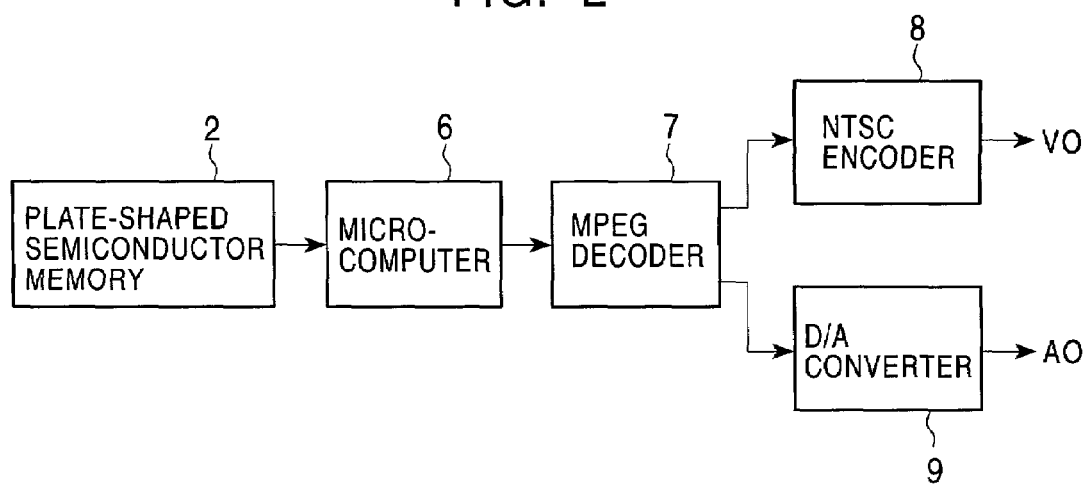
FIG. 2 is a block diagram illustrating a configuration of the information playback apparatus.

FIG. 2 is a block diagram illustrating a configuration of the information playback apparatus.

As shown in FIG. 2, the information playback apparatus 1 includes a plate-shaped semiconductor memory 2 in which compressed moving data and compressed audio data are stored, a microcomputer 6 responsible for control of the apparatus, an MPEG (Moving Picture Experts Group) decoder 7 for producing image data and audio data by decompressing the compressed moving data and the compressed audio data, an NTSC encoder 8 for encoding the image data into the NTSC (National Television System Committee) format and outputting a resultant video output signal VO including R (red), G (green), and B (blue) components, and a D/A (digital-to-analog) converter 9 for converting the audio data into analog form and outputting a resultant audio output signal AO.

The information playback apparatus configured in the above-described manner operates as follows.

In FIG. 2, the microcomputer 6 reads compressed image data and compressed audio data stored in the plate-shaped semiconductor memory 2. The compressed image data and the compressed audio data are supplied to the MPEG decoder 7. The MPEG decoder 7 reproduces image data by decompressing the compressed image data and also reproduces audio data by decompressing the compressed audio data.

The image data reproduced by the MPEG decoder 7 is supplied to the NTSC encoder 8. The NTSC encoder 8 converts the received image data into a composite signal and outputs it as a video output signal VO. On the other hand, the audio data reproduced by the MPEG decoder 7 is supplied to the D/A converter 9. The D/A converter 9 converts the received audio data into analog form and outputs it as an audio output signal AO.

Figure 3:
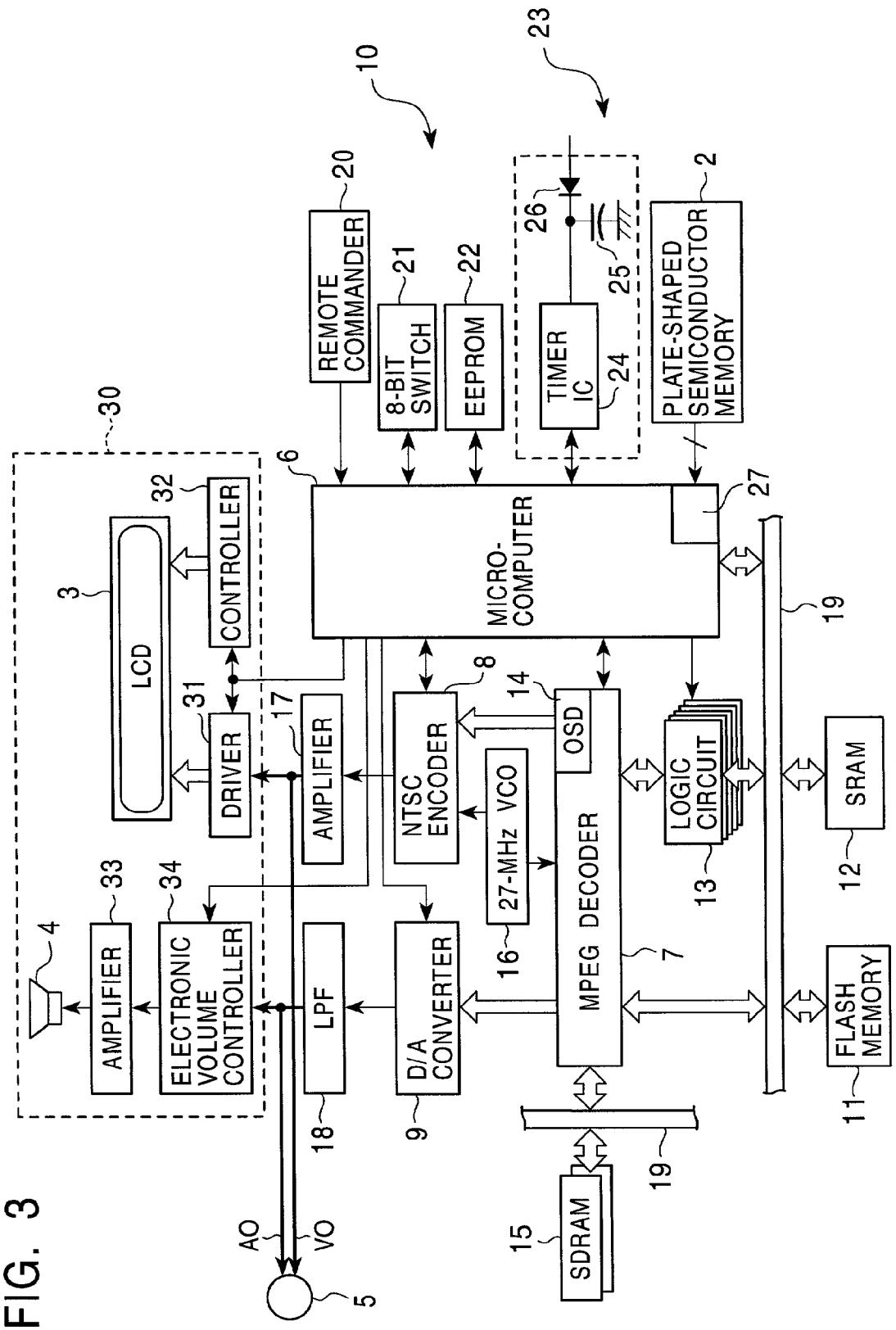
FIG. 3 a block diagram illustrating the detailed configuration of the information playback apparatus.

FIG. 3 is a block diagram illustrating the detailed configuration of the information playback apparatus 1.

As shown in FIG. 3, the information playback apparatus 1 includes a main unit 10 and an output unit 30. In the following detailed description with reference to FIG. 3, duplicate description of parts which have been already described above with reference to FIG. 2 is not made.

The main unit 10 includes a flash ROM (Read Only Memory) 11 for storing control data and a control program, an SRAM (Static Random Access Memory) 12 for storing data read from the plate-shaped semiconductor memory 2, a logic circuit 13 for controlling the timing of reading data from the SRAM 12, and an 8-bit bus 19.

The main unit 10 also includes an OSD (On Screen Display) output unit 14 disposed in the MPEG decoder 7, for generating character data for use in a menu or the like, and also includes an SDRAM (Synchronous Dynamic RAM) 15 used by the MPEG decoder 7.

The main unit 10 also includes a VCO (Voltage Controlled Oscillator) 16 for generating a 27 MHz signal used by the NTSC encoder 8, an amplifier 17 for amplifying the signal output from the NTSC encoder 8 to a predetermined level and outputting the resultant signal as the video output signal VO, and an LPF (Low Pass Filter) 18 for removing noise contained in the output of the D/A converter 9.

The main unit 10 also includes a remote commander 20 for receiving an infrared control signal from an external remote controller and supplying a predetermined control signal to the microcomputer 6, an 8-bit switch 21 used to set an identification code, which will be described later, to the microcomputer 6, and an EEPROM (Electrical Erasable Programmable Read Only Memory) 22 for storing the identification code in a nonvolatile fashion.

The main unit 10 also includes a plate-shaped semiconductor memory driver 27 disposed inside the microcomputer 6, for interfacing with the plate-shaped semiconductor memory 2.

The main unit 10 also includes a timer unit 23 used by the microcomputer 6 to perform a timer operation. The timer unit 23 includes a timer IC 24 for setting a timer operation, an electrical double layer capacitor C25 having a long discharging time and capable of retaining a voltage for 3 days, and a diode 26 for preventing a current from flowing in a reverse direction.

The output unit 30 includes a driver 31 for supplying a driving signal for driving the LCD 3 so as to display an image in accordance with the video output signal VO and also includes a controller 32 for supplying a synchronization signal for controlling the timing of the displaying operation of the LCD 3.

The output unit 30 further includes an electronic volume controller 34 for adjusting the output level of the audio output signal AO under the control of the microcomputer 6 and also includes an amplifier 33 for amplifying the level-adjusted audio output signal by a predetermined amplification factor.

The information playback apparatus 1 is not necessarily needed to include the timer unit 23 and the output unit 30. Instead of using the output unit 30, an external monitor and an external speaker may be connected to the main unit 10 via the external output terminal 5 and via a cable.

A power supply voltage used by the information playback apparatus is generated as follows. First, a 100 V AC (Alternating Current) voltage is converted to a 6 V DC voltage by an AC converter. The 6 V DC voltage is then lowered to 5 V and 2.5 V voltages using a voltage regulator. The 6 V DC voltage is also lowered to 3.3 V voltage and raised to 12 V and 15 V voltages by a D/D (Direct Current to Direct Current converter.

For example, the 2.5 V and 3.3 V voltages are used by the MPEG decoder 7, the 3.3 V voltage by the microcomputer 6, the 5 V voltage by the electrical double layer capacitor 25, the amplifiers 17 and 33 and the LPF 18, and the 12 V and 15 V voltages by the LCD 3.

Figure 4:
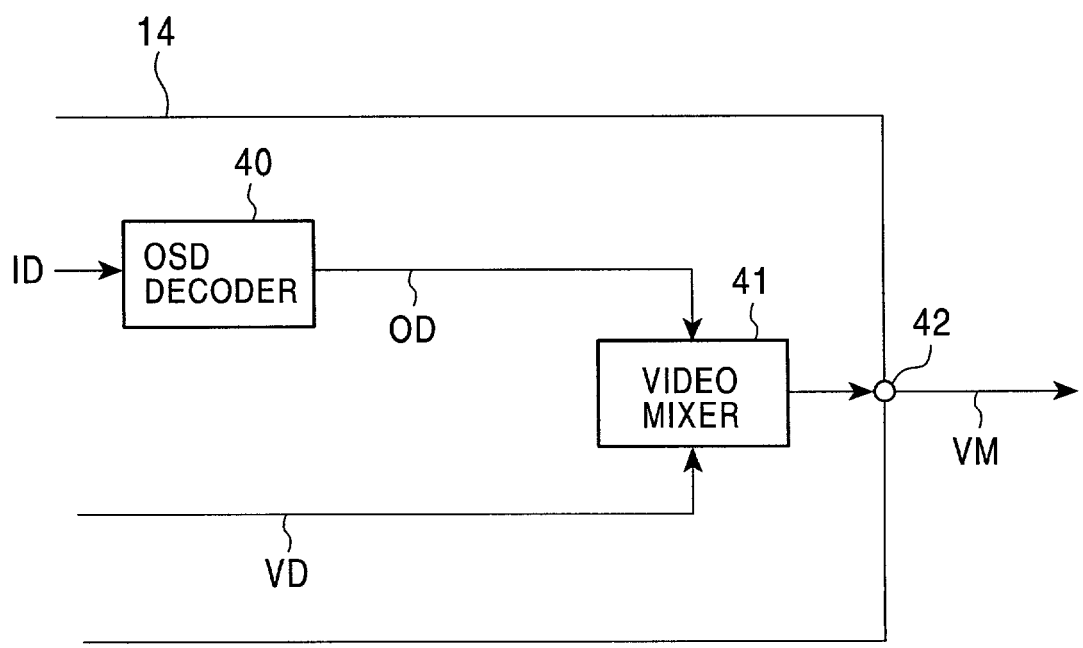
FIG. 4 is a block diagram illustrating an output part of an OSD decoder.

FIG. 4 is a block diagram illustrating the OSD output unit. As shown in FIG. 4, the OSD output unit 14 includes an OSD decoder 40 for decoding input data ID into OSD data OD such as character data to be displayed in a menu screen, a video mixer 41 for mixing the OSD data OD and the image data VD reproduced by means of decompression, and an output terminal 42 for outputting the mixed video data VM.

With this OSD output unit 14, it is possible to superimpose OSD data such as a menu screen upon reproduced image data and display the resultant data on the LCD 3.

Instead of providing the OSD output unit 14 in the MPEG decoder 7, OSD data supplied from the outside may be mixed with the reproduced image data and the resultant data may be output.

The operations of the respective parts of the information playback apparatus are described below with reference to FIGS. 5 and 7.

Figure 5:
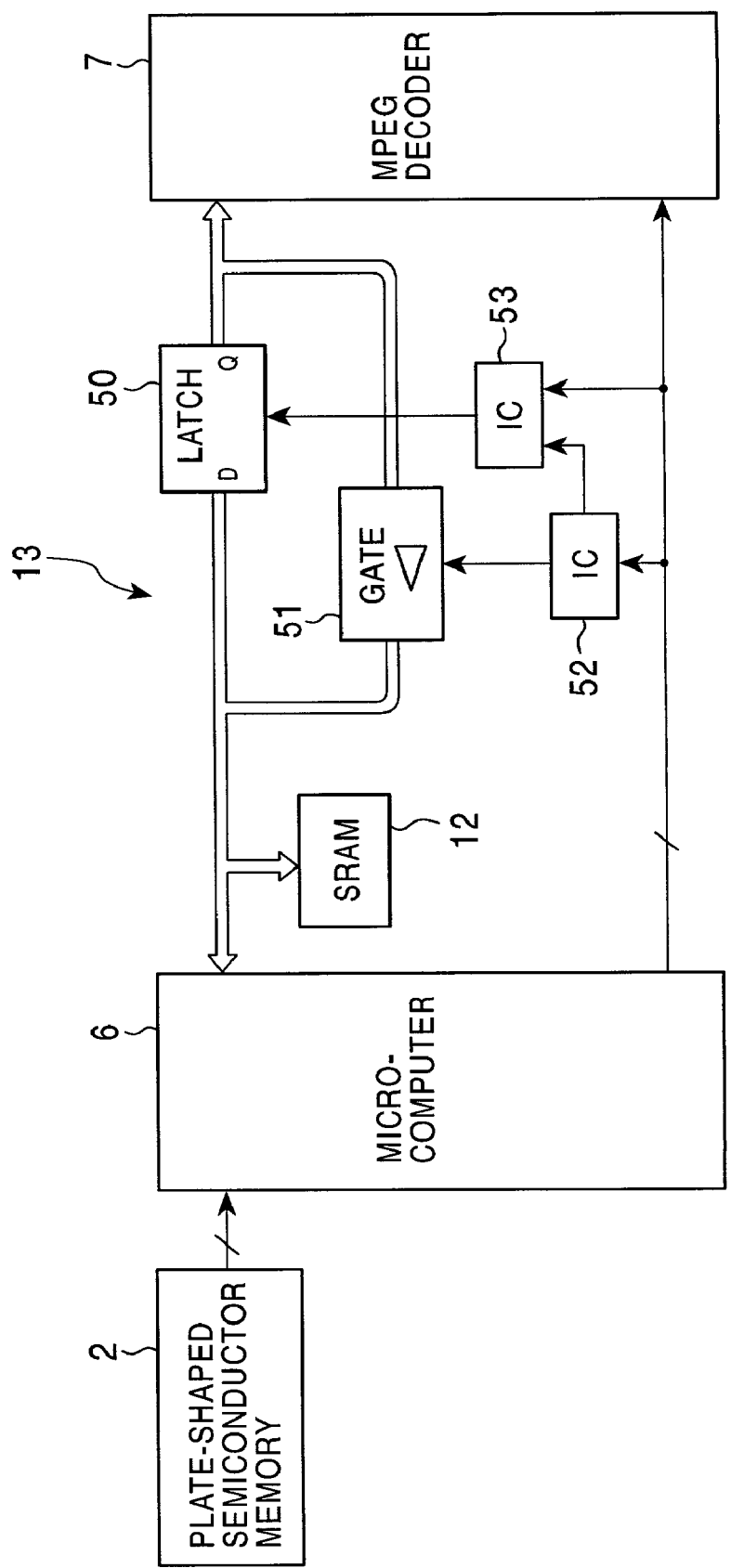
FIG. 5 is a block diagram illustrating a part for controlling the timing of transferring playback data.

FIG. 5 illustrates a part for controlling the timing of transferring playback data.

In FIG. 5, the microcomputer 6 reads compressed image and audio data stored in the plate-shaped semiconductor memory 2. The reading from the plate-shaped semiconductor memory 2 is performed in units of, for example, 512 bytes at a rate of, for example, 2.45 Mbytes/sec. The reading of the compressed image and audio data from the plate-shaped semiconductor memory 2 is performed in accordance with a 3-line serial scheme.

After being read, the compressed image and audio data are temporarily stored in the SRAM 12. Once the data is stored in the SRAM 12, the playback operation can be continued even if the plate-shaped semiconductor memory 2 is removed from the attachment mechanism of the information playback apparatus 1. The storage capacity of the SRAM 12 is properly selected to be large enough to store the compressed image and audio data transferred from the plate-shaped semiconductor memory 2.

The compressed image data-and audio data written in the SRAM 12 are read by the microcomputer 6 and transferred to the MPEG decoder 7. When the data are transferred, the timing of transferring the data between the microcomputer 6 and the MPEG decoder 7 is controlled by the logic circuit 13.

More specifically, although the microcomputer processes 16-bit data at a clock frequency of 20 MHz, the MPEG decoder 7 processes 8-bit data at a clock frequency of 100 MHz. Therefore, each time 16-bit data is transferred from the microcomputer 6 to the MPEG decoder 7, it is necessary to return the data twice from the MPEG decoder 7 to the microcomputer 6.

To this end, there are provided a latch 50 for latching data to be transferred, a gate 51 for returning data, an IC (Integrated Circuit) 53 for controlling the timing of latching data into the latch 50 and outputting the data from the latch 50, and an IC 52 for controlling the timing of outputting data from the gate 51.

In the MPEG decoder 7, the image data and the audio data compressed in the MPEG-1 format are decompressed. A macro code according to which the MPEG decoder 7 performs decompression is written in the flash ROM 11. When the electric power is turned on, the microcomputer 6 reads the macro code and controls the MPEG decoder 7 in accordance therewith. The above macro code is used to perform an operation corresponding to a "playback" operation of the playback apparatus.

Figure 6:
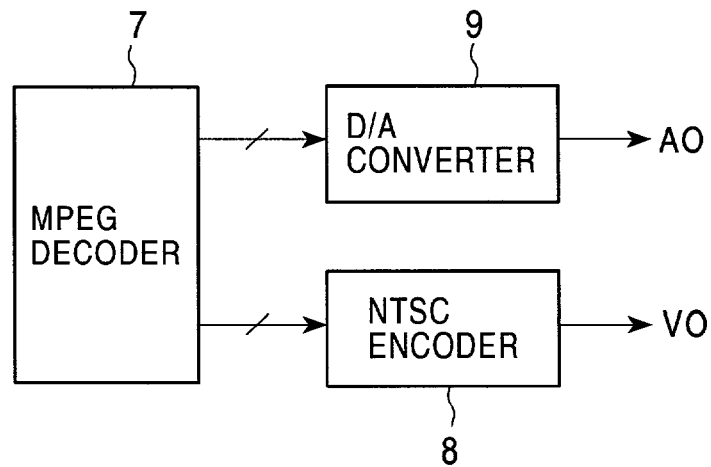
FIG. 6 is a block diagram illustrating an audio output part and a video output part.

FIG. 6 is a block diagram illustrating an audio output unit and a video output unit.

In FIG. 6, image data decompressed by the MPEG decoder 7 is supplied in the form of 8-bit parallel data to the NTSC encoder 8. The NTSC encoder 8 converts the received data into an RGB composite signal and outputs the resultant signal as a video output signal VO.

Audio data decompressed by the MPEG decoder 7 is supplied to the D/A converter 9. The D/A converter converts the received audio data into an analog signal including a clock signal, an L (left) signal, and an R (right) signal and outputs the resultant signal as an audio output signal AO.

The VCO 16 shown in FIG. 3 generates a data reference clock signal at 27 MHz by multiplying a 13.5 MHz frequency generated by a crystal oscillator by a factor of 2. The generated reference clock signal is supplied to the MPEG decoder 7 and the NTSC encoder 8.

The video output signal VO in the form of the composite signal is amplified by the amplifier 17 shown in FIG. 3 by a factor of 2 (6 dB) and output over a line via the external output terminal 5 terminated with 75 Ω.

The video output signal VO in the form of the composite signal is also supplied to the output unit 30 shown in FIG. 3. In the output unit 30, the video output signal VO is output to the LCD 3 with vertical and horizontal timings controlled by the controller 32.

The displaying of OSD data such as menu data on the LCD 3 is performed using the OSD output unit 14 in the MPEG decoder 7.

On the other hand, the analog audio output signal AO is applied to the LPF 18 shown in FIG. 3 and noise contained in the analog audio signal AO is removed. The resultant signal is output over a line via the external output terminal 5.

The analog audio output signal AO is also supplied to the output unit 30 shown in FIG. 3. In the output unit 30, the audio signal is variably amplified by the electronic volume controller 34 and the amplifier 33 so as to adjust the audio signal level, and the resultant audio signal is output to the speaker 4.

The electronic volume controller 34 controls the audio signal level under the control of the microcomputer 6 in response to a control signal given by an external remote controller via the remote commander 20.

In the timer unit 23, as shown in FIG. 3, the electric power for the timer IC 24 which provides the timer functionality is backed up by the electrical double layer capacitor 25.

The current time and the timer conditions such as an alarming time set by the microcomputer 6 are stored in the timer IC 24 itself for a period in which the electric power for the timer IC 24 is backed up by the electrical double layer capacitor 25.

The timer operation using the timer IC 24 is performed, for example, such that the operation of displaying a reproduced image on the LCD 3 is started 2 minutes before a store is opened (for example, at 10 a.m.) and the operation is stopped at a time (8 p.m., for example) at which the store is closed.

If the microcomputer 6 itself has a timer capability, the timer operation may be performed without using the timer unit 23.

Figure 7:
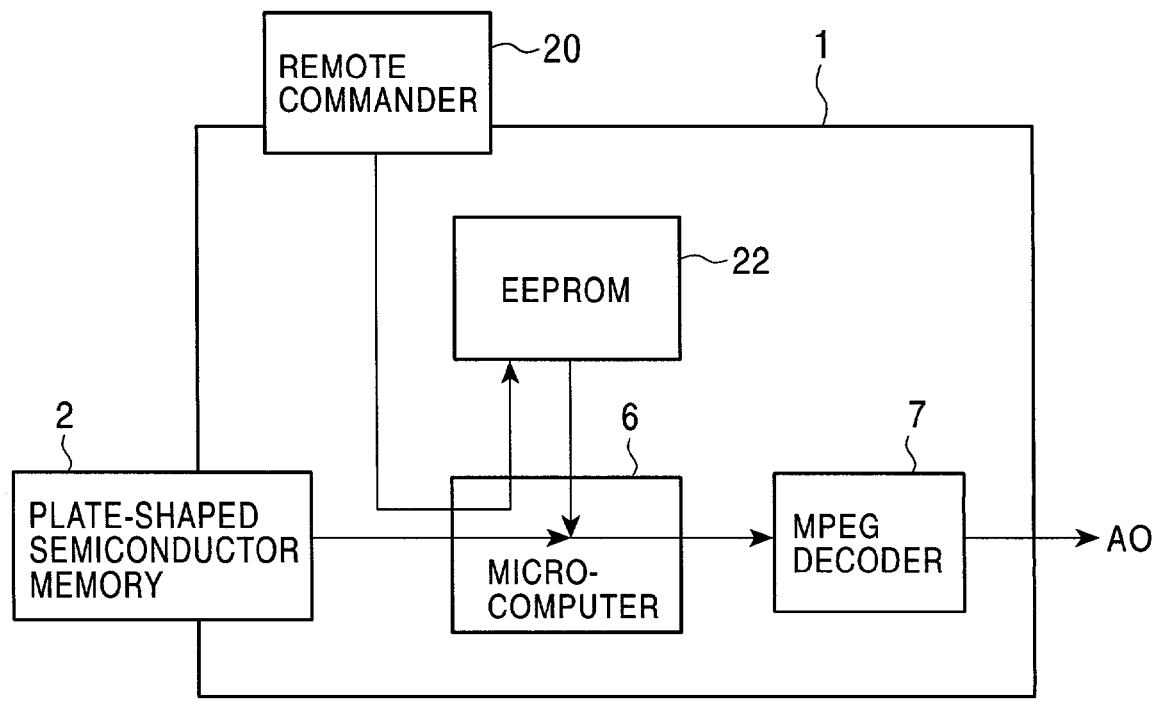
FIG. 7 is a schematic diagram illustrating the operation of setting a custom code.

FIG. 7 illustrates the operation of setting a customer code identifying a customer.

In FIG. 7, the information playback apparatus 1 determines whether a customer code written, using a personal computer or the like, in the plate-shaped semiconductor memory 2 is consistent with a customer code preset in the EEPROM 22 of the information playback apparatus 1. If these customer codes are not consistent with each other, the playback operation is not started thereby achieving a protection capability.

The setting of the customer code into the plate-shaped semiconductor memory 2 may be performed by writing the customer code into the plate-shaped semiconductor memory 2 using a personal computer or the like.

On the other hand, the setting of the customer code into the information playback apparatus 1 may be performed as follows. First, the data representing the customer code is input into the microcomputer 6 via the remote commander 20 by operating an 8-bit switch 21 or an external remote controller. The microcomputer 6 then sets the data into the EEPROM 22 in accordance with the input data. After the electric power is turned off, the data set in the EEPROM 22 is retained without being lost.

In FIG. 7, when the electric power is turned on, the microcomputer 6 reads the custom code stored in the EEPROM 22 and compares it with the custom code contained in the compressed data read from the plate-shaped semiconductor memory 2.

Only when the two codes are consistent with each other, the microcomputer 6 starts the playback operation. If they are not consistent with each other, the microcomputer 6 displays an error message on the LCD 3 using the OSD output unit 14.

The adjustment of image quality of the LCD 3 can be performed in a similar manner to the setting operation described above with reference to FIG. 7. That is, if adjustment data is input by operating the 8-bit switch 21 or the external remote controller, the adjustment data is input to the microcomputer 6 via the remote commander 20. In response, the microcomputer 6 sets the adjustment data into the EEPROM 22.

The number of customer codes may be determined to be large enough so that protection can be achieved for each of manufacturers of the information playback apparatus 1 and the plate-shaped semiconductor memory 2, business companies which sell or lease the information playback apparatus 1 and the plate-shaped semiconductor memory 2, and stores in which the information playback apparatus 1 and the plate-shaped semiconductor memory 2 are disposed. For example, if 8-bit data up to 00FF is used, it is possible to describe 256 customer codes.

For example, when the information playback apparatus 1 or the plate-shaped semiconductor memory 2 is shipped from a manufacturer, a manufacturer code is set therein such that the information playback apparatus 1 and the plate-shaped semiconductor memory 2 cannot be used unless the code is replaced with a correct customer code.

When a business company or a lease company purchases the information playback apparatus 1 or the plate-shaped semiconductor memory 2, a customer code is written therein so that the information playback apparatus 1 performs a playback operation only when consistency of the customer code is obtained.

For the purpose of demonstration of a new product or for the purpose of particular service, the code may be set using the 8-bit switch 21 shown in FIG. 3 so that the operation is allowed for all customer codes.

FIG. 8 illustrates the structure of protection data. The data structure shown in FIG. 8 is based upon the MPEG-1 format.

Figure 8A:
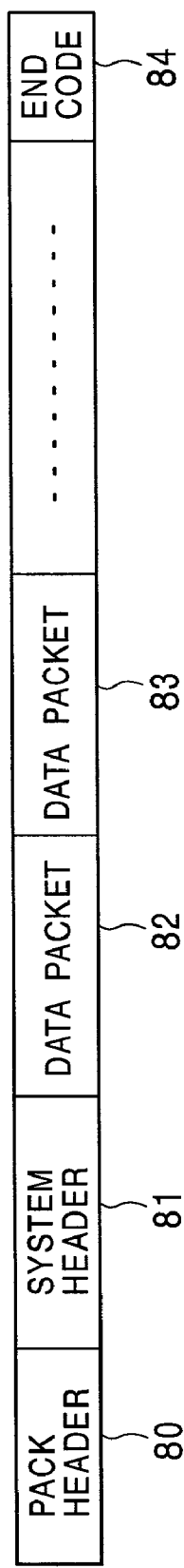
FIG. 8A is a schematic diagram illustrating a data structure of a usual MPEG data.

FIG. 8A illustrates usual MPEG data including a pack header 80, a system header 81, data packets 82, 83, . . . , and an end code 84.

Figure 8B:
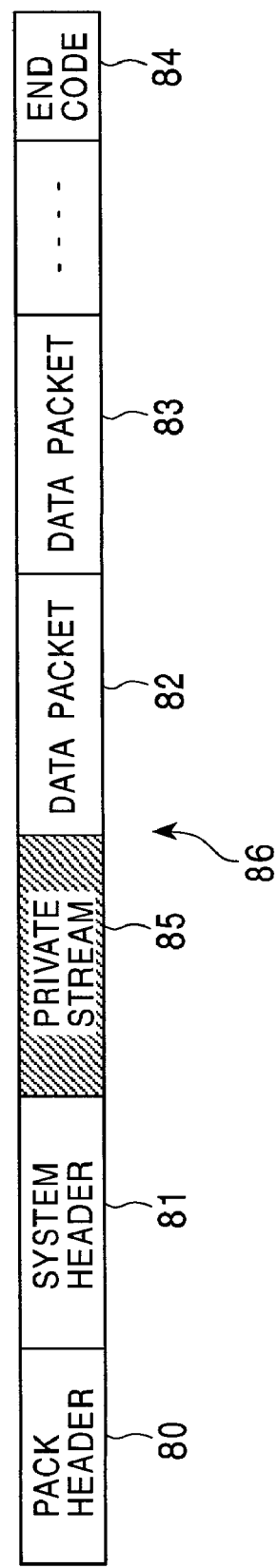
FIG. 8B is a schematic diagram illustrating a protection data structure in an MPEG data for use in an electronic POP advertisement.

FIG. 8B illustrates MPEG data for use in the electronic POP advertising apparatus according to the present embodiment. This MPEG data includes a pack header 80, a system header 81, a private stream packet 85, a data packets 82, 83, . . . , and en end code 84.

The private stream packet 85 serves as a custom code describing area 86. In the present embodiment, the MPEG decoder 7 of the information playback apparatus 1 detects the private stream packet 85. The microcomputer 6 reads a custom code described in the custom code describing area 86 of the private stream packet 85 and compares it with the custom code set in the EEPROM 22.

Although the configuration of the information playback apparatus 1 has been described above with reference to a specific example, the configuration is not limited to such an example. That is, the information playback apparatus 1 may be constructed into an arbitrary configuration as long as data can be reproduced from the plate-shaped semiconductor memory 2.

External Shape of the Plate-Shaped Semiconductor Memory

The external shape of the plate-shaped semiconductor memory serving as a storage medium according to the present embodiment is described below. The plate-shaped semiconductor memory includes a memory device with a predetermined storage capacity disposed in a plate-shaped case. In this specific embodiment, a flash memory is used as the memory device.

A terminal part including a plurality of electrodes is formed in a lower end area on the front surface and on the lower end face of a case. Via this terminal part, data is read and written from or into the memory device disposed inside the case. In the upper left corner of the case, a cutout is formed. The cutout prevents the plate-shaped semiconductor memory from being inserted in a wrong direction into the attachment mechanism of the information playback apparatus. A slide switch for preventing the stored data from being erased by mistake is disposed on the bottom surface. The plate-shaped semiconductor memory 2 used in the present embodiment may have a size of 55 mm by 55 mm or smaller.

Format of Data Stored in the Plate-Shaped Semiconductor Memory

Hierarchical Structure of Memory File System

The format employed in the system using the plate-shaped semiconductor memory as the storage medium is briefly described below.

The file system of the system using the plate-shaped semiconductor memory as the storage medium is formed of hierarchical layers including an application layer at the top and, below that, a file management layer, a logical address layer, a physical address layer, and a flash memory access, in this order.

In the operation of recording and reproducing a data file, all of the application layer, the file management layer, the logical address layer, the physical address layer, and the flash memory access are used.

Physical Data Structure

The physical data structure of the flash memory used as the memory device in the plate-shaped semiconductor memory is described below.

The storage area of the flash memory is formed of minimum fixed data units called segments. Each segment has a fixed size of 4 MB or 8 MB. The number of segments of one flash memory varies depending upon the storage capacity of that flash memory.

The available storage capacities of the flash memory are 16 MB, 32 MB, 64 MB, and 128 MB.

Concepts of Physical Address and Logical Address

Each block is assigned a physical address. The physical addresses are determined in the order of locations of the blocks in the memory, and thus each block has a unique relationship with its physical address.

The blocks include used blocks in which block data is stored and unused blocks in which no data is stored.

Logical addresses are assigned to the respective data written in blocks.

In the file system of the flash memory, when data stored at certain physical addresses are rewritten or partially deleted to update the data, updated data are not rewritten in the same blocks but written in unused blocks.

In this case, the logical addresses which have been determined so as to correspond to the physical addresses at which the data were located before being updated are changed so as to correspond to new physical addresses at which the updated data are located.

That is, the physical addresses are uniquely assigned to the blocks, and the logical addresses are uniquely assigned to data when the data are written in blocks and the same addresses are used even if the data are rewritten into different blocks.

Logical-Physical Address Conversion Table

As described above, when blocks are swapped, the correspondence between physical addresses and logical addresses changes. Therefore, in order to correctly access the flash memory to write or read data, it is necessary to use a logical-physical address conversion table indicating the correspondence between physical addresses and logical addresses.

File Structure of the Plate-Shaped Semiconductor Memory

Directory Structure

The file structure of files stored in the plate-shaped semiconductor memory 2 is described below.

First, an example of a directory structure is described.

FIG. 9 illustrates an example of a directory structure of the plate-shaped semiconductor memory.

As described above, examples of main data which can be dealt with by the plate-shaped semiconductor memory include moving image data, still image data, audio data (voice data), HiFi audio data (music data), and control data. In order to store such different data, directories may be constructed so as to include, under a root directory 90, as shown in FIG. 9, "MEMSTICK.ind" (plate-shaped semiconductor memory file) 91, "DCIM" (still image file storage directory) 92, "VOICE" (audio file storage directory) 93, "HIFI" (music file storage directory) 94, "MSxxx" (manufacturer file (moving image file) storage directory) 95, "MOVIE" (moving image file storage directory) 96, and "DATA" (information file storage directory) 97.

The directory "MSxxx" (manufacturer file (moving image file) storage directory) 95 includes a subdirectory "SMoo" (business company file storage directory) 98 which in turn includes a subdirectory "PATCH" (control program storage directory) 99.

The directory "SMoo" (business company file storage directory) 98 also includes a file "-----.mpg" (moving image file provided for a particular store) 101 and a file "-----.mpg" (moving file associated with a particular article) 102 (and also moving files 103 to 106 associated with respective other articles).

The directory "PATCH" (control program storage directory) 99 includes a file "xxx.mot" (control program file) 100.

Thus, according to the present embodiment, it is possible to replace the advertisement moving image data in the form of compressed image data for a particular apparatus 1 with other data using the plate-shaped semiconductor memory 2.

Because compressed moving image data is electrically stored in the plate-shaped semiconductor memory 2, a mechanism having a movable part for reading data is not necessary to be provided in the information playback apparatus 1. Therefore, a problem due to degradation in the movable part does not occur, and the absence of such a mechanism allows a reduction in the apparatus size.

Furthermore, because the compressed moving image data is electrically stored in the plate-shaped semiconductor memory 2, no degradation in the compressed moving image file data occurs. Thus, the plate-shaped semiconductor memory 2 is suitable for continuously reproducing data, and high reliability can be achieved in the reproduction of the data.

Furthermore, the electrically storing of compressed moving image data in the plate-shaped semiconductor memory 2 makes it possible to easily rewrite the data.

Furthermore, it is possible to update the control program using the pate-shaped semiconductor memory 2. This makes it possible to easily grade up the program of the information playback apparatus 1.

The image quality of the LCD 3 of the information playback apparatus 1 may be adjusted in terms of a plurality of items using the control program.

Furthermore, the control program may be used to dynamically control the microcomputer 6 in the information playback apparatus 1 so as to replace a program having an error or a bug with a program including no error.

The plate-shaped semiconductor memory 2 may also be used as an extended ROM for storing control data used by the microcomputer 6 disposed in the information playback apparatus 1.

It is also possible to display a setting menu on the screen of the LCD 3 of the information playback apparatus 1 using the OSD output unit 14. Through the menu, the customer code identifying the information playback apparatus 1 is set in the information playback apparatus 1, and the customer code which identifies the plate-shaped semiconductor memory 2 and which has a one-to-one correspondence with the customer code identifying the information playback apparatus 1 is described in the compressed moving image file data stored in the plate-shaped semiconductor memory 2, thereby ensuring protection such that the operation is performed only when the two customer codes are consistent with each other.

A plurality of compressed moving image data may be stored in the plate-shaped semiconductor memory 2 and they may be played back in a predetermined order or a random order.

Furthermore, using the timer unit 23, data may be played back during a particular period of time in the morning or afternoon.

A buffer memory is not necessary because compressed moving image file data is played back in real time from the plate-shaped semiconductor memory 2. Because the information playback apparatus 1 includes the SRAM 12, it is possible to play back data after the plate-shaped semiconductor memory 2 is removed from the attachment unit of the information playback apparatus 1.

If two attachment units are provided on the information playback apparatus 1 and if two plate-shaped semiconductor memories 2 are attached thereto, it becomes possible to continuously play back moving image data by alternately reading data from the two plate-shaped semiconductor memories 2.

The storage medium applicable to the information playback apparatus 1 according to the present embodiment is not limited to the plate-shaped semiconductor memory 2 such as that shown in FIG. 1. For example, a solid-state memory medium (such as a memory chip, memory card, or a memory module) having an external shape other than that of the plate-shaped semiconductor memory 2.

The details of the file system format described above may be modified depending upon practical use.

Furthermore, the variations in the storage capacity of the flash memory are not limited to those described above. Furthermore, the memory device used in the storage medium according to the present embodiment is not limited to the flash memory. Other types of volatile memory devices such as a dynamic (D) RAM or a static (S) RAM may also be employed.

Now, an electronic POP advertising apparatus according to the present invention is described below with reference to the drawings.

Referring to FIG. 10, an electronic POP advertising apparatus according to a first embodiment of the present invention includes a sensor unit 110 including a reflective-type infrared sensor for detecting presence of a person, an electronic advertising unit 210 for storing data of advertisements and outputting a POP advertisement, and a remote commander 410 for selecting an advertisement to be output from the electronic advertising unit 210.

The electronic advertising unit 210 includes a sensor signal receiver 220 for receiving a person detection signal from the sensor unit 110, a remote control signal receiver 230 for receiving a remote control signal from the remote commander 410, a microcomputer 240 for controlling the operation so as to output a particular POP advertisement in accordance with signals received from the sensor signal receiver 220 and from the remote control signal receiver 230, an advertisement medium 250 in which a plurality of files of different advertisement data are stored, a data storage unit 260 for reading POP advertisement data from the advertisement medium 250, a decoder 270 for superimposing character information (OSD) upon a POP advertisement video signal and for decoding an audio signal into a surround sound, a memory 280 used by the microcomputer to store data, D/A converter 290 for converting a digital video signal and a digital audio signal into an analog video signal and an analog audio signal, respectively, an operation control unit 300 for making a selection via a POP advertisement menu, an audio output unit 310 including a speaker for outputting a voice/sound according to the analog audio signal, and an image displaying unit 320 for displaying an advertisement image according to the analog video signal.

The D/A converter 290 includes a D/A controller 291 for converting a digital audio signal into an analog audio signal and a video encoder 292 for converting a digital video signal into an analog video signal. The microcomputer 204 includes, although not shown, means for selecting a particular one of a plurality of POP advertisements stored in the data storage unit 260 and means for outputting the selected particular POP advertisement in response to a detection signal from the sensor unit 110.

The sensor unit 110 is a reflective-type infrared sensor for detecting presence of a person and is formed separately from the electronic advertising unit 210. The sensor unit 110 includes an infrared emitting device 120 for emitting an infrared ray, an infrared detector 130 for detecting a reflected infrared ray, an amplifier 140 for amplifying a received signal, and a person detection signal transmitter 150 for transmitting a person detection signal based on the amplified signal.

Figure 11:
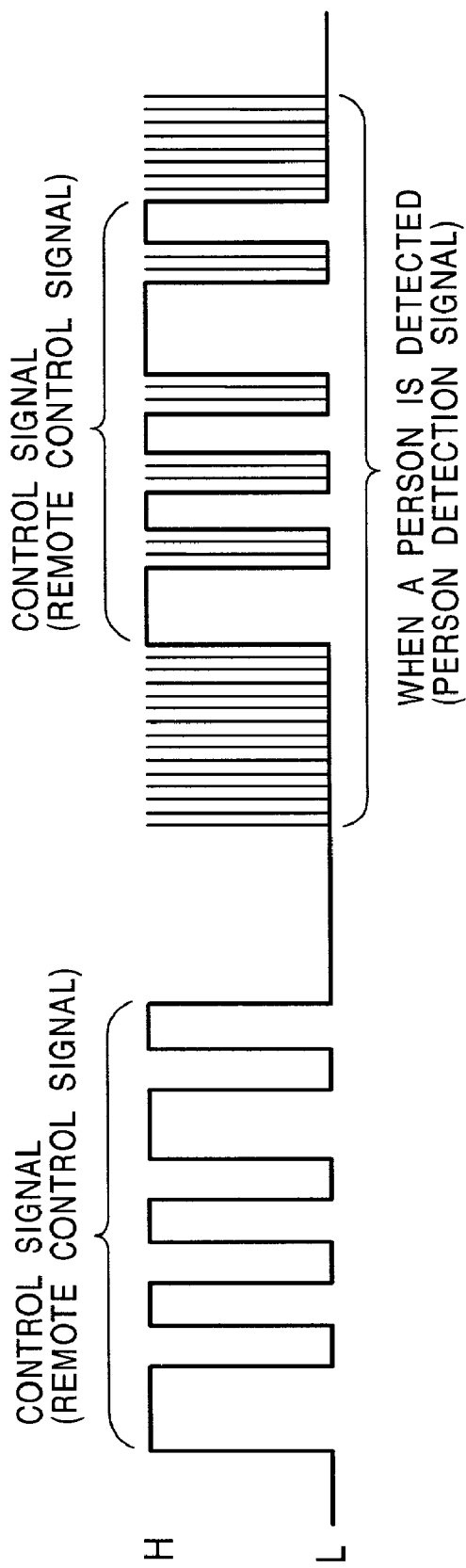
FIG. 11 is a schematic diagram illustrating a person detection signal output from a sensor in the electronic POP advertising apparatus.

The person detection signal is transmitted by superimposing a high-frequency signal upon a low-frequency remote control signal transmitted from the remote control commander 410. FIG. 11 illustrates a remote control signal and a person detection signal. When no person is detected, only a low-frequency remote control signal consisting of pulses with different pulse widths is transmitted. However, when a person is detected, a high-frequency pulse signal is superimposed upon the above low-frequency remote control signal. This makes it possible for the electronic advertising unit 210 to analyze the person detection signal in a similar manner to analysis of the remote control signal, and thus it becomes possible to use the same device for both the sensor signal receiver 220 and the remote control signal receiver 230. Of course, the person detection signal may be separately transmitted without being superimposed upon the remote control signal.

Figure 12:
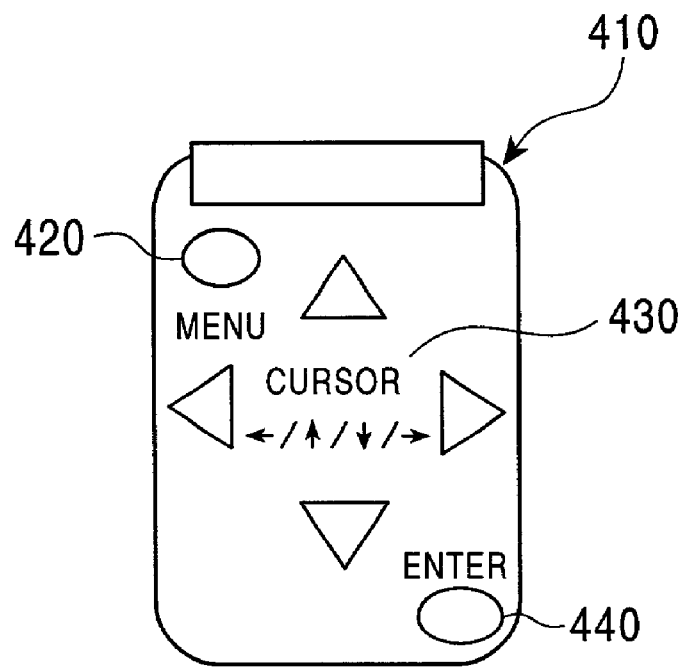
FIG. 12 is a schematic diagram illustrating a remote commander of the electronic POP advertising apparatus.

The remote commander 410 includes, as shown in FIG. 12, a menu button 420 used to display an advertisement menu on the screen, cursor buttons 430 for moving a pointer in left, right, upward, and downward directions to make a selection via the menu displayed on the screen, and an ENTER button 440 for entering a selection pointed to by the pointer.

Figure 13:
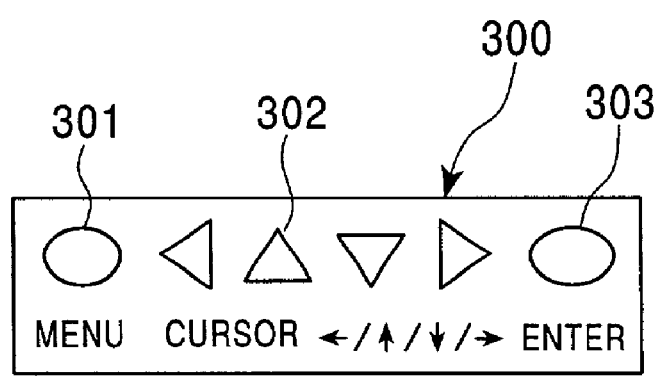
FIG. 13 is a schematic diagram illustrating various buttons on an operation control unit of the electronic POP advertising apparatus.

As can be seen from FIG. 13, the operation control unit 300 has similar functions to the remote commander 410 and includes a menu button 301 used to display an advertisement menu on the screen, cursor buttons 302 for moving a pointer in left, right, upward, and downward directions to make a selection via the menu displayed on the screen, and an ENTER button 303 for entering a selection pointed to by the pointer.

Figure 14:
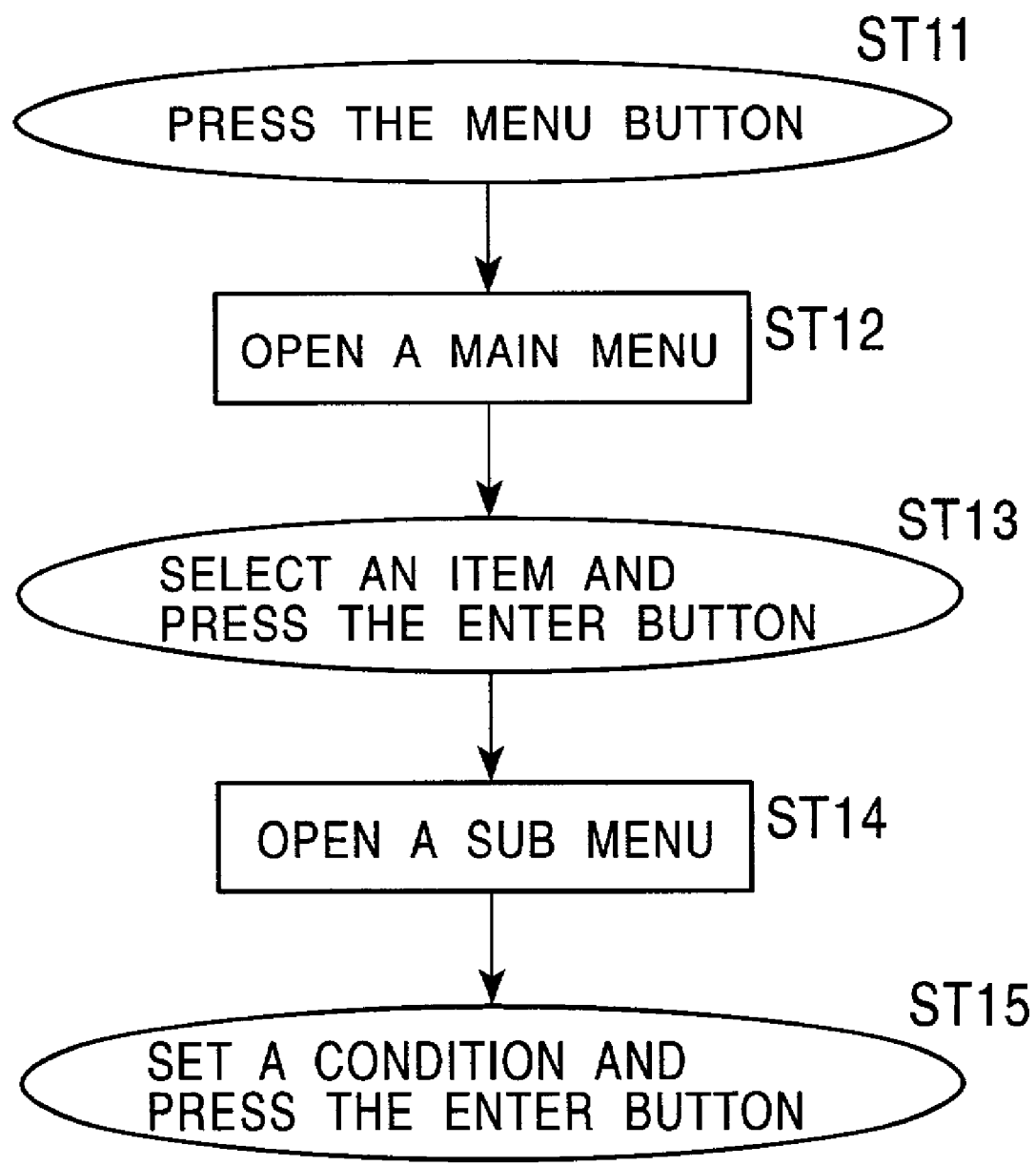
FIG. 14 is a flow chart illustrating an operation of the remote commander.
Figure 15:
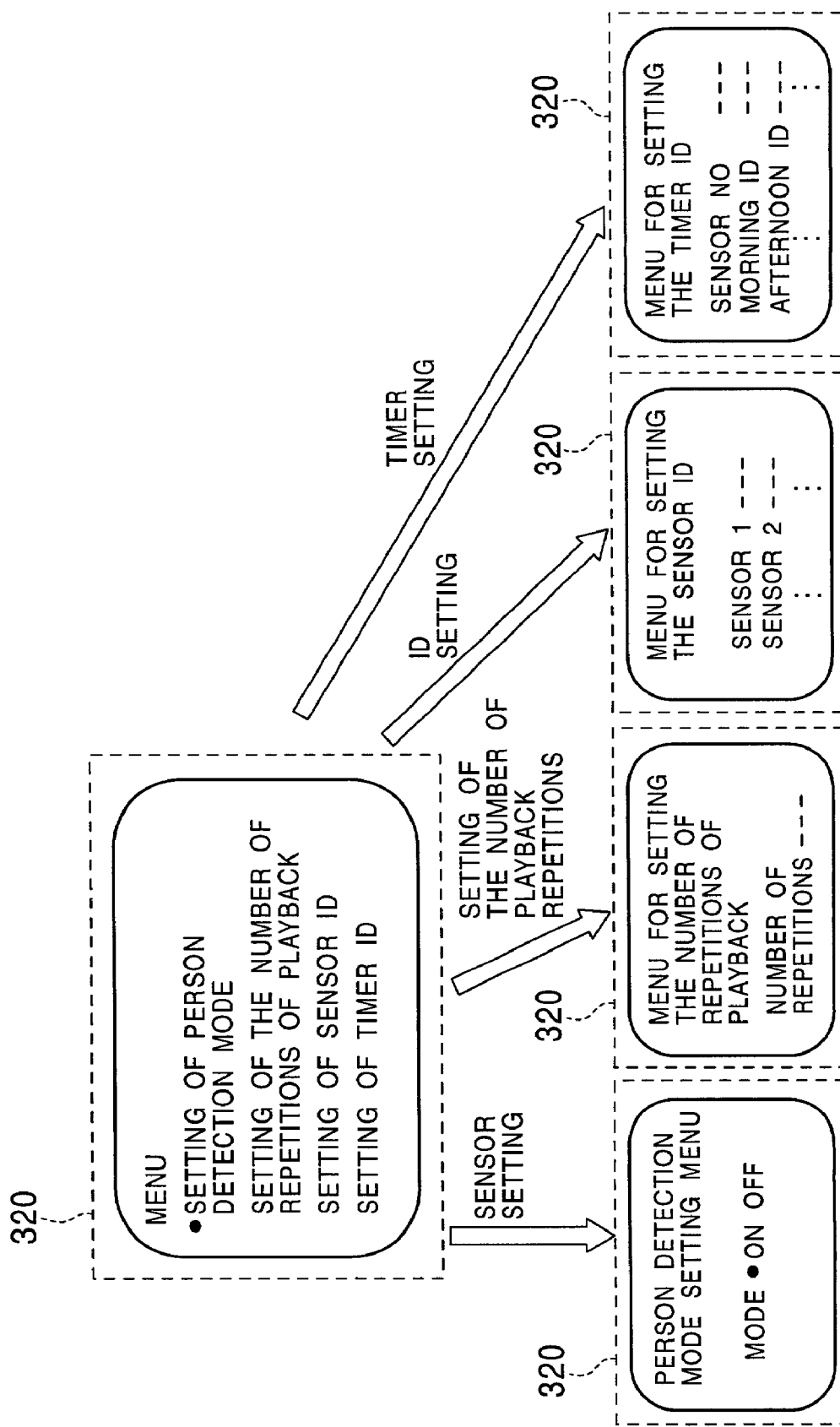
FIG. 15 is a schematic diagram illustrating an example of a manner in which setting is performed using the remote commander.

The operations of the remote commander 410 and the operation control unit 300 having the above-described structures are described below with reference to a flow chart shown in FIG. 14 and also to a menu screen shown in FIG. 15.

To select a desired advertisement, if the menu button 420 (301) is pressed (step S11), a main menu is opened (step ST12). The main menu displays setting items for selecting one of submenus including a person detection mode setting menu, a menu for setting the number of playback repetitions, a sensor ID setting menu, and a timer ID setting menu. If an ENTER button 440 (303) is pressed after selecting one of the submenus (step ST13), a selected submenu is displayed. In the case where the person detection mode setting menu was selected, it is possible to set whether or not person detection is to be performed. Similarly, it is possible to set the number of playback repetitions via the menu for setting the number of playback repetitions. Via the sensor ID setting menu, IDs can be set for respective sensors (first sensor, second sensor, sensor unit 110). The timer ID setting menu is used to set a plurality of timers. For example, it is possible to set timers such that the first sensor is used in the morning and the second sensor is used in the afternoon.

Figure 16:
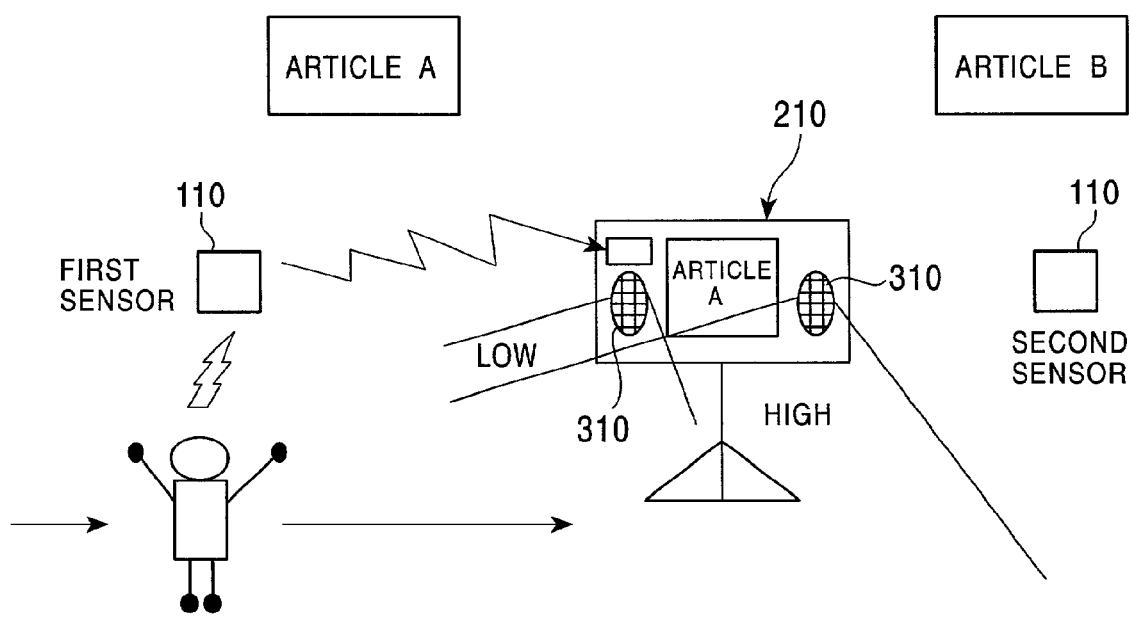
FIG. 16 is a schematic diagram illustrating an example of a manner in which the electronic POP advertising apparatus is used.

The electronic advertising unit 210 and the sensor unit 110 constructed in the above-described manners are disposed, for example, such that the sensor unit 110 serving as the first sensor is disposed near an area where an article A is placed, another sensor unit 110 serving as the second sensor is disposed near an area where an article B is placed, and the electronic advertising unit 210 is disposed between the article A and the article B. In this electronic POP advertising apparatus configured in the above-described manner, if the first sensor (sensor unit 110) detects a person walking toward the article A from the left side of FIG. 16, the first sensor transmits a person detection signal to the electronic advertising unit 210. The electronic advertising unit 210 analyzes the received signal and determines, in this specific case, that the person detection signal has been transmitted from the first sensor (sensor unit 110). Thus, the electronic advertising unit 210 reads a POP advertisement associated with the article A from the data storage unit 260 (FIG. 10) and displays it on the screen. At the same time, associated voice information is output from the speakers such that a less loud voice is output from a speaker disposed near the detected person and a loud voice is output from a speaker at a distant location so that the person near the article A can easily hear the voice. The presentation of the POP advertisement is started when a person is detected and ended when the end of the POP advertisement file associated with the article A is reached. This means that even if another person is detected by the second sensor (sensor unit 110) located near the article B when the POP advertisement associated with the article A is being presented, a POP advertisement associated with the article B is not started. As described above, the number of times the POP advertisement is repeated can be set via the menu.

On the other hand, in the case where the second sensor (sensor unit 110) disposed near the article B detects a person, the POP advertisement associated with the article B is presented.

As described above, although there is disposed only one electronic advertising unit 210, if a person, who is interested in a particular one of articles, approaches that article, a POP advertisement associated with that particular article is presented by the electronic advertisement unit 210. That is, it is possible to timely present a proper POP advertisement selected from various advertisements.

An electronic POP advertising apparatus according to a second embodiment of the present invention is described below with reference to a drawing.

Figure 17:
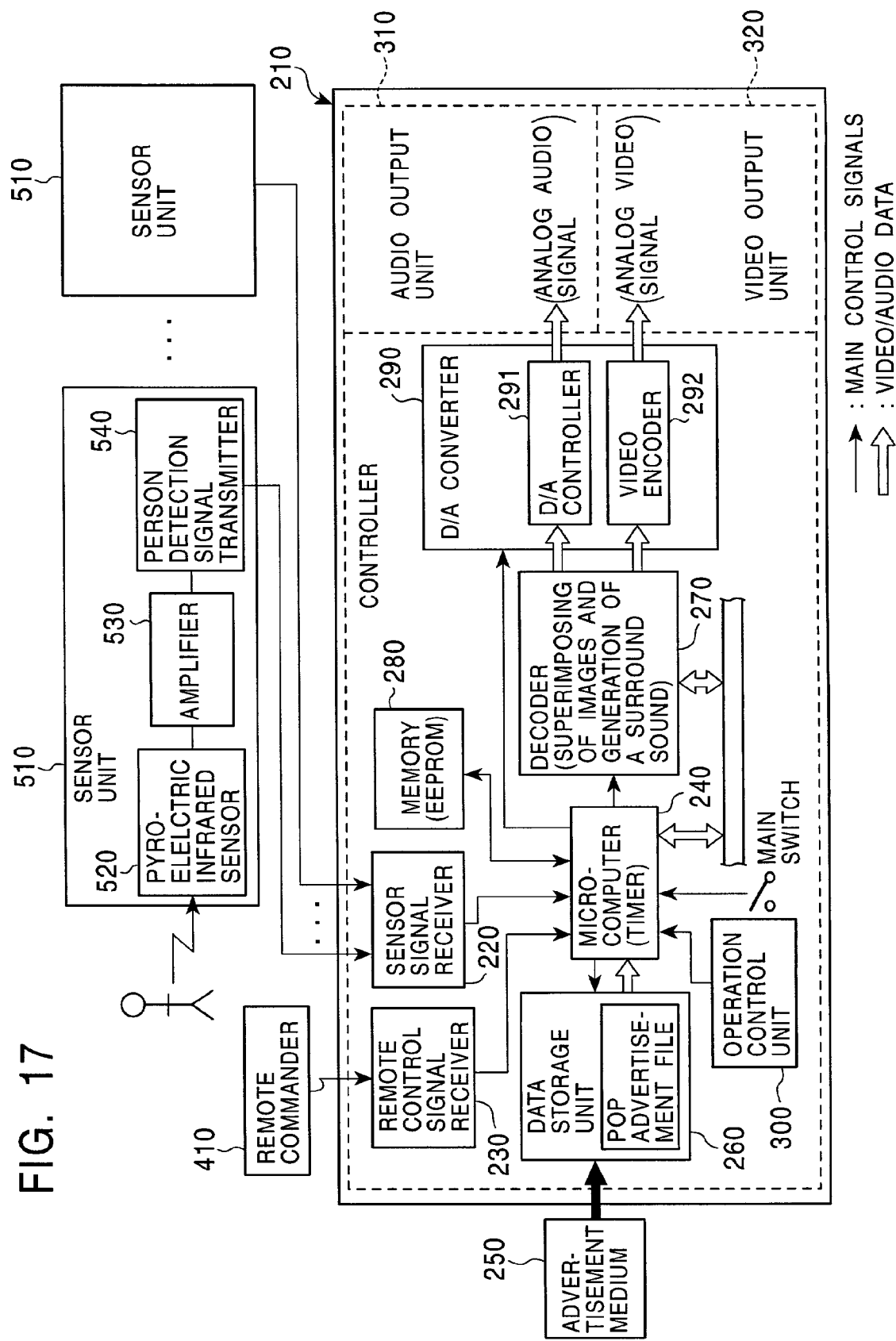
FIG. 17 is a block diagram generally illustrating the configuration of an electronic POP advertising apparatus according to a second embodiment of the present invention.

The electronic POP advertising apparatus according to the second embodiment of the present invention includes, as shown in FIG. 17, a sensor unit 510 including a an electronic advertising unit 210 for storing data of advertisements and outputting a POP advertisement, and a remote commander 410 for selecting an advertisement to be output from the electronic advertising unit 210.

The electronic advertising unit 210 used herein is configured in the same manner as the electronic advertising unit 210 according to the first embodiment described above, and thus includes a sensor signal receiver 220 for receiving a person detection signal from the sensor unit 510, a remote control signal receiver 230 for receiving a remote control signal from the remote commander 410, a microcomputer 240 for controlling the operation so as to output a particular advertisement in accordance with signals received from the sensor signal receiver 220 and from the remote control signal receiver 230, an advertisement medium 250 in which a plurality of files of different advertisement data are stored, a data storage unit 260 for reading advertisement data from the advertisement medium 250, a decoder 270 for superimposing character information (OSD) upon an advertisement video signal and for decoding an audio signal into a surround sound, a memory 280 used by the microcomputer 240 to store obtained data, D/A converter 290 for converting a digital video signal and a digital audio signal into an analog video signal and an analog audio signal, respectively, an operation control unit 300 for making a selection via a POP advertisement menu, an audio output unit 310 including a speaker for outputting a voice/sound according to the analog audio signal, and an image displaying unit 320 for displaying a POP advertisement image according to the analog video signal. The microcomputer 240 includes, although not shown, means for selecting a particular one of a plurality of POP advertisements stored in the data storage unit 260 and means for outputting the selected particular POP advertisement in response to a detection signal from the sensor unit 510.

The sensor unit 510 is formed separately from the electronic advertising unit 210 and includes a pyroelectric infrared sensor 520 for detecting presence of a person, an amplifier 530 for amplifying a detected signal, and a person detection signal transmitter 540 for transmitting a person detection signal based on the amplified signal.

The remote commander 410 is similar to that employed in the first embodiment described above with reference to FIG. 12, and thus includes a menu button 420 used to display a POP advertisement menu on the screen, cursors 430 for moving a pointer in left, right, upward, and downward directions to make a selection via the menu displayed on the screen, and an ENTER button 440 for entering a selection pointed to by the pointer.

The operation control unit 300 is similar to that employed in the first embodiment described above with reference to FIG. 13, and thus includes a menu button 301 used to display a POP advertisement menu on the screen, cursors 302 for moving a pointer in left, right, upward, and downward directions to make a selection via the menu displayed on the screen, and an ENTER button 303 for entering a selection pointed to by the pointer.

The electronic POP advertising apparatus includes, as in the first embodiment, includes a sensor unit 510 disposed near a particular article so that when a person is detected by the sensor unit 510, a POP advertisement associated with that particular article is presented by outputting an image and a voice.

An electronic POP advertising apparatus according to a third embodiment of the present invention is described below with reference to a drawing.

Figure 18:
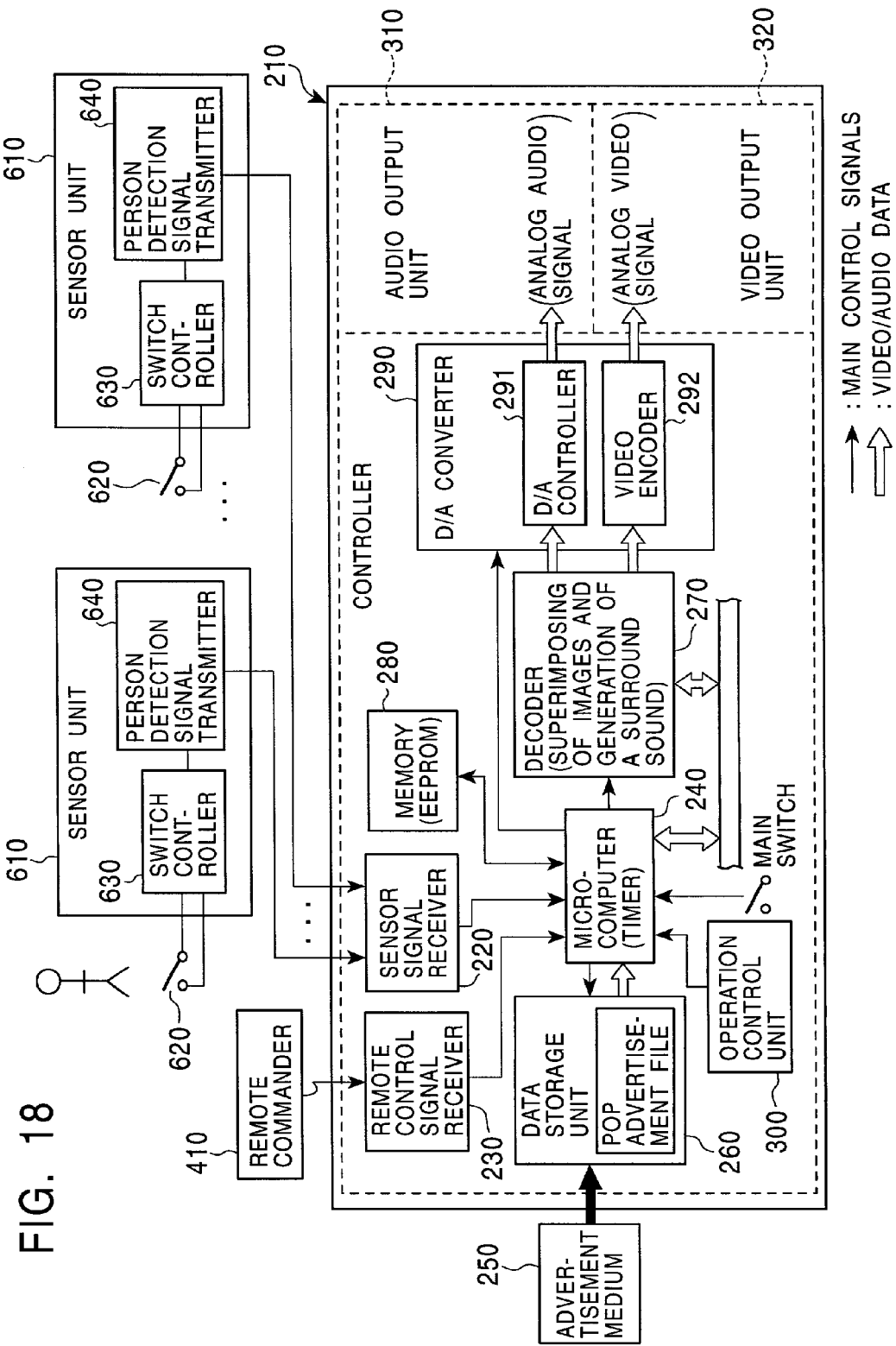
FIG. 18 is a block diagram generally illustrating the configuration of an electronic POP advertising apparatus according to a third embodiment of the present invention.

The electronic POP advertising apparatus according to the third embodiment of the present invention includes, as shown in FIG. 18, a sensor unit 610 including a mechanical switch for detecting a person, an electronic advertising unit 210 for storing data of advertisements and outputting a POP advertisement, and a remote commander 410 for selecting an advertisement to be output from the electronic advertising unit 210.

The electronic advertising unit 210 includes, as in the first embodiment, a sensor signal receiver 220 for receiving a person detection signal from the sensor unit 610, a remote control signal receiver 230 for receiving a remote control signal from the remote commander 410, a microcomputer 240 for controlling the operation so as to output a particular advertisement in accordance with signals received from the sensor signal receiver 220 and from the remote control signal receiver 230, an advertisement medium 250 in which a plurality of files of different advertisement data are stored, a data storage unit 260 for reading advertisement data from the advertisement medium 250, a decoder 270 for superimposing character information (OSD) upon an advertisement video signal and for decoding an audio signal into a surround sound, a memory 280 used by the microcomputer 240 to store obtained data, D/A converter 290 for converting a digital video signal and a digital audio signal into an analog video signal and an analog audio signal, respectively, an operation control unit 300 for making a selection via a POP advertisement menu, an audio output unit 310 including a speaker for outputting a voice/sound according to the analog audio signal, an image displaying unit 320 for displaying an advertisement image according to the analog video signal. The microcomputer 240 includes, although not shown, means for selecting a particular one of a plurality of POP advertisements stored in the data storage unit 260 and means for outputting the selected particular POP advertisement in response to a detection signal from the sensor unit 610.

The sensor unit 610 is formed separately from the electronic advertising unit 210 and includes a mechanical switch 620 for detecting presence of a person, a switch controller 630 for amplifying a signal from the switch, and a person detection signal transmitter 640 for transmitting a person detection signal based on the signal amplified by the switch controller 630.

The remote commander 410 is similar to that employed in the first embodiment described above with reference to FIG. 12, and thus includes a menu button 420 used to display an advertisement menu on the screen, cursors 430 for moving a pointer in left, right, upward, and downward directions to make a selection via the menu displayed on the screen, and an ENTER button 440 for entering a selection pointed to by the pointer.

The operation control unit 310 is similar to that employed in the first embodiment described above with reference to FIG. 13, and thus includes a menu button 301 used to display an advertisement menu on the screen, cursors 302 for moving a pointer in left, right, upward, and downward directions to make a selection via the menu displayed on the screen, and an ENTER button 303 for entering a selection pointed to by the pointer.

The electronic POP advertising apparatus includes, as in the first embodiment, includes a sensor unit 610 disposed near a particular article whereby when the switch of the sensor unit 610 is turned on, a POP advertisement associated with that particular article is presented by outputting an image and a voice in response to a turning-on signal.

An electronic POP advertising apparatus according to a fourth embodiment of the present invention is described below with reference to a drawing.

Figure 19:
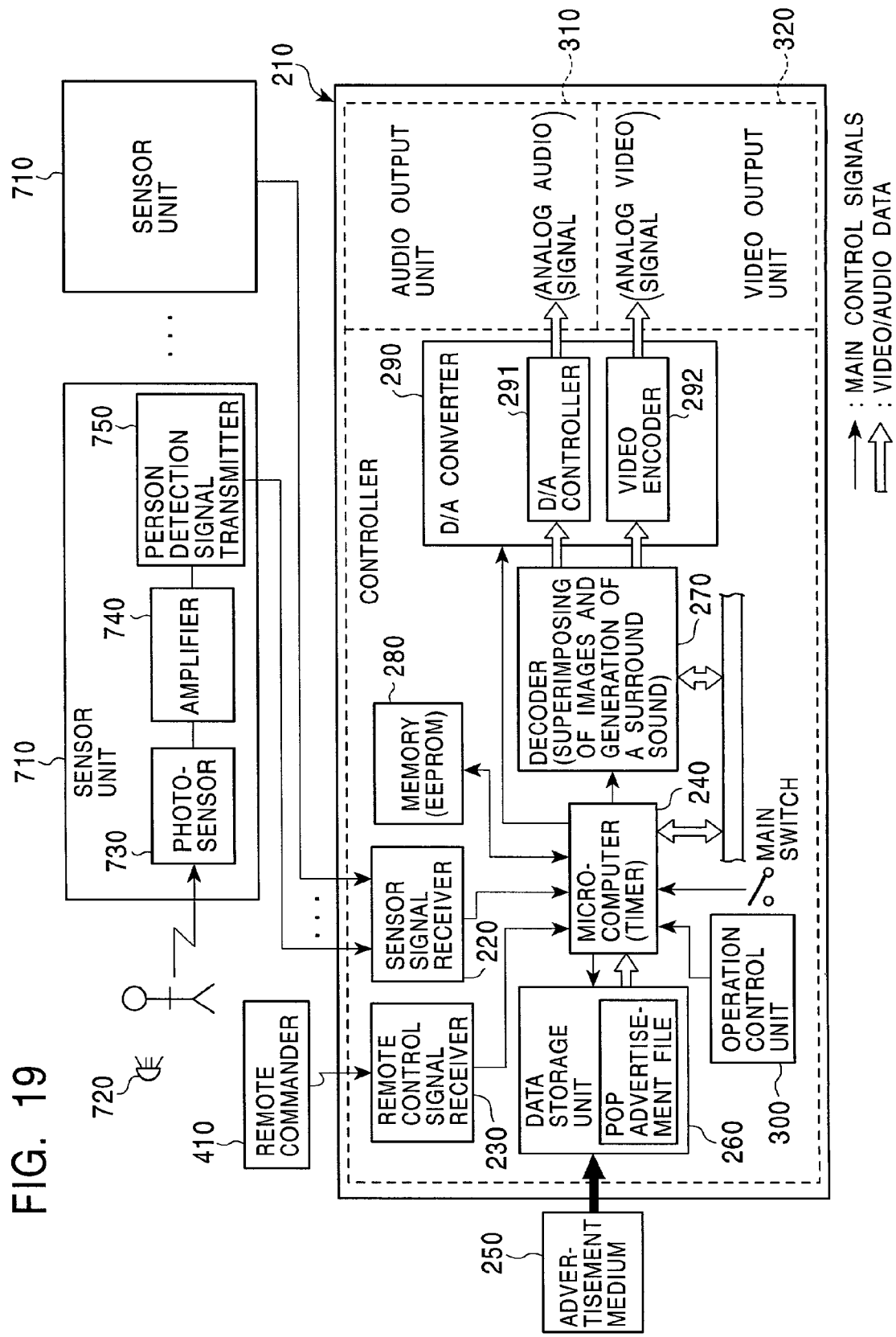
FIG. 19 is a block diagram generally illustrating the configuration of an electronic POP advertising apparatus according to a fourth embodiment of the present invention.

The electronic POP advertising apparatus according to the fourth embodiment of the present invention includes, as shown in FIG. 19, a sensor unit 710 including a photosensor 730, an electronic advertising unit 210 for storing data of advertisements and outputting a POP advertisement, and a remote commander 410 for selecting an advertisement to be output from the electronic advertising unit 210.

The electronic advertising unit 210 includes, as in the first embodiment, a sensor signal receiver 220 for receiving a person detection signal from the sensor unit 710, a remote control signal receiver 230 for receiving a remote control signal from the remote commander 410, a microcomputer 240 for controlling the operation so as to output a particular advertisement in accordance with signals received from the sensor signal receiver 220 and from the remote control signal receiver 230, an advertisement medium 250 in which a plurality of files of different advertisement data are stored, a data storage unit 260 for reading advertisement data from the advertisement medium 250, a decoder 270 for superimposing character information (OSD) upon an advertisement video signal and for decoding an audio signal into a surround sound, a memory 280 used by the microcomputer 240 to store obtained data, D/A converter 290 for converting a digital video signal and a digital audio signal into an analog video signal and an analog audio signal, respectively, an operation control unit 300 for making a selection via a POP advertisement menu, an audio output unit 310-including a speaker for outputting a voice/sound according to the analog audio signal, an image displaying unit 320 for displaying an advertisement image according to the analog video signal. The microcomputer 240 includes, although not shown, means for selecting a particular one of a plurality of POP advertisements stored in the data storage unit 260 and means for outputting the selected particular POP advertisement in response to a detection signal from the sensor unit 710.

The sensor unit 710 is formed separately from the electronic advertising unit 210 and includes a photosensor 730 for detecting presence of a person who blocks light emitted from a light source 702, an amplifier 740 for amplifying a signal output from the photosensor 730, and a person detection signal transmitter 750 for transmitting a person detection signal based on the amplified signal. The light source may be a usual lighting device disposed in a store or may be a dedicated light source. Of course, a photosensor coupled with a laser may be employed.

The remote commander 410 is similar to that employed in the first embodiment described above with reference to FIG. 12, and thus includes a menu button 420 used to display an advertisement menu on the screen, cursors 430 for moving a pointer in left, right, upward, and downward directions to make a selection via the menu displayed on the screen, and an ENTER button 440 for entering a selection pointed to by the pointer.

The operation control unit 300 is similar to that employed in the first embodiment described above with reference to FIG. 13, and thus includes a menu button 301 used to display an advertisement menu on the screen, cursors 302 for moving a pointer in left, right, upward, and downward directions to make a selection via the menu displayed on the screen, and an ENTER button 303 for entering a selection pointed to by the pointer.

The electronic POP advertising apparatus includes, as in the first embodiment, includes a sensor unit 710 disposed near a particular article. If light which is emitted from a light source 720 and which is sensed by a photosensor 730 is blocked by a person, the blocking of light is detected by the photosensor 730. In response to a detection signal output from the photosensor 730, a POP advertisement associated with the particular article is presented by outputting an image and a voice.

An electronic POP advertising apparatus according to a fifth embodiment of the present invention is described below with reference to drawings.

As shown in FIGS. 20 to 31, the electronic POP advertising apparatus according to the fifth embodiment of the present invention includes is formed by combining the electronic advertising unit 210 and one or a plurality of one type of or a combination of different types of sensor units 110, 510, 610 and 710 according to the first to fourth embodiments. One or a plurality of sensor units may be installed in the electronic advertising unit 210.

Figure 20:
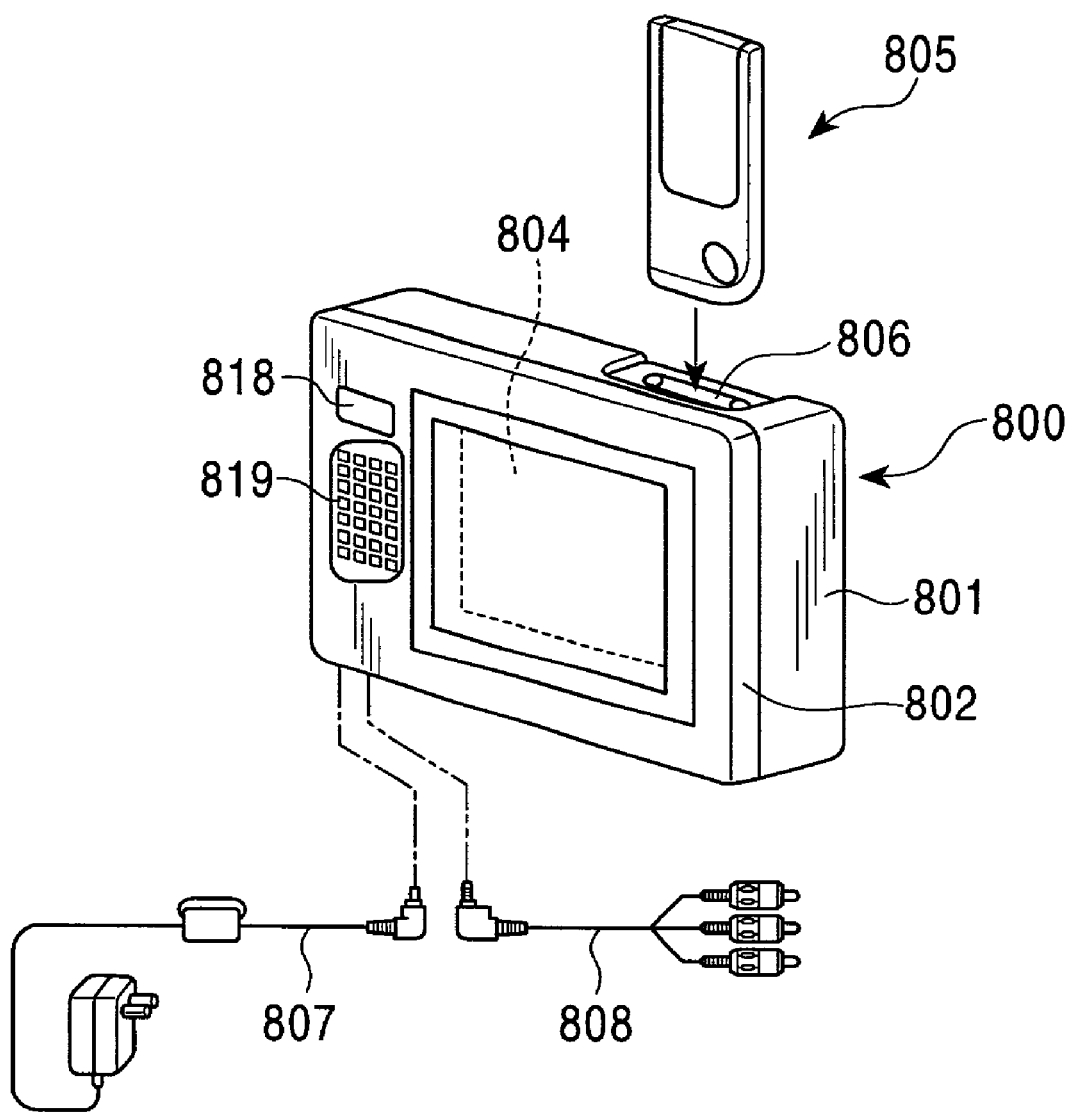
FIG. 20 is a block diagram generally illustrating the configuration of an electronic POP advertising apparatus according to a fifth embodiment of the present invention.
Figure 21:
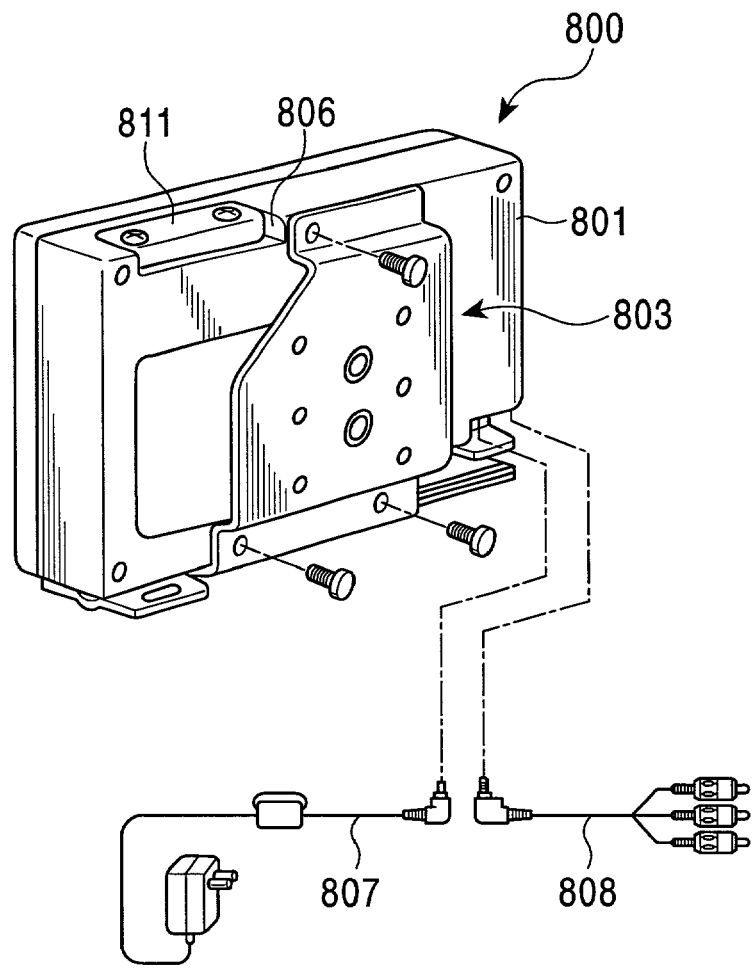
FIG. 21 is a schematic diagram illustrating a general structure of the electronic POP advertising apparatus seen from its backside.

As shown in FIGS. 20 and 21, the electronic advertising unit 800 includes a main part 801 in the form of a rectangular parallelepiped, a panel case 802 attached to the front surface of the main part 801, and a fixing member 803 attached to the back side of the main part 801.

Figure 23:
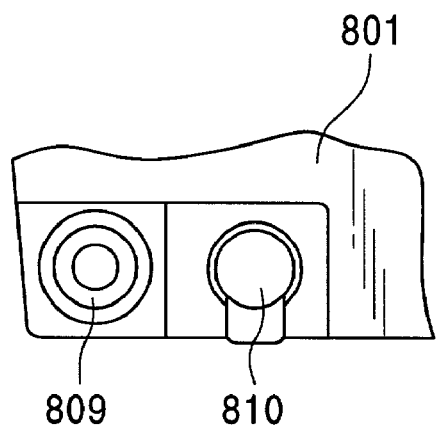
FIG. 23 is an enlarged partial view partially illustrating terminal connectors.
Figure 24:
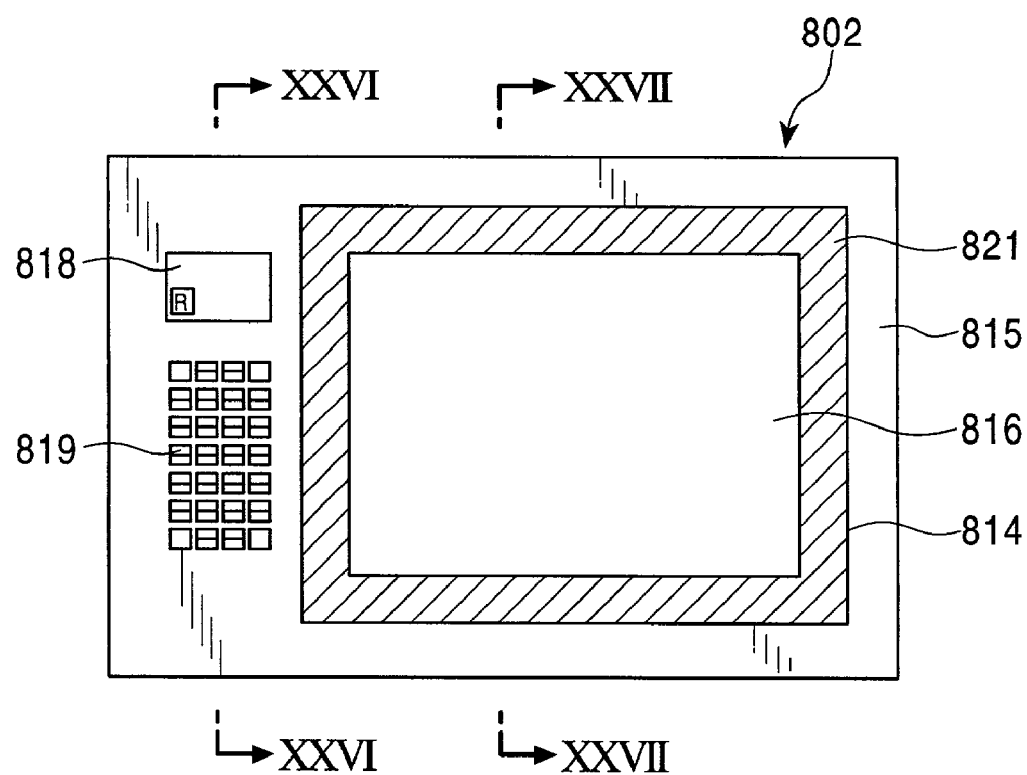
FIG. 24 is a plan view illustrating a panel case of the electronic POP advertising apparatus.
Figure 25:
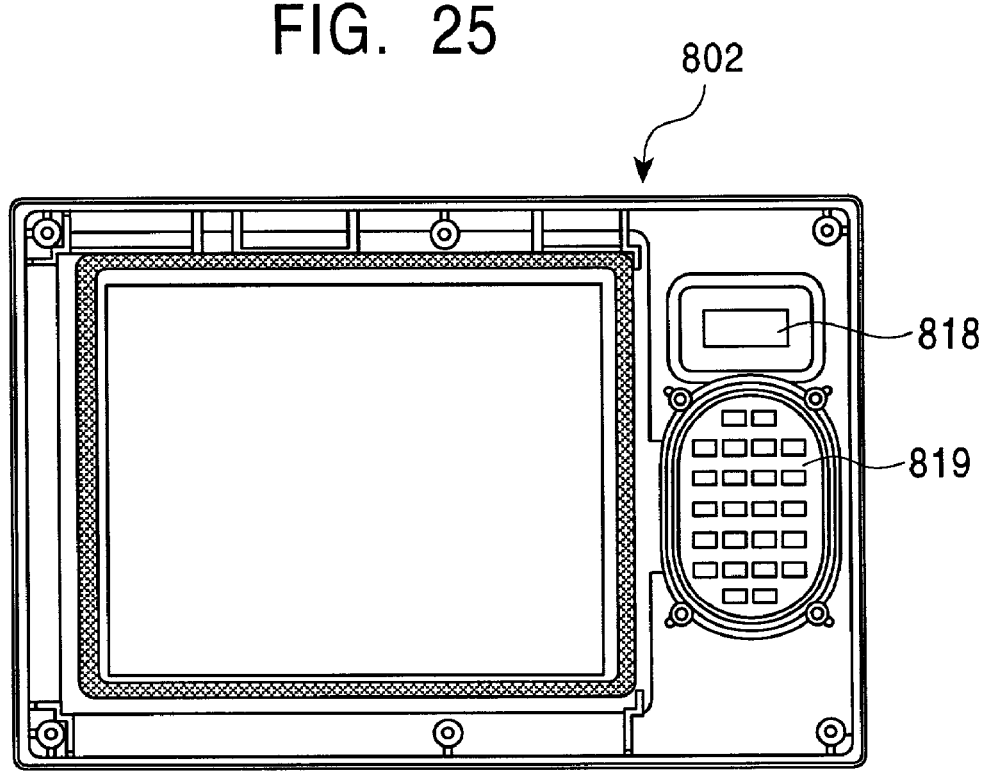
FIG. 25 is a back view of the panel case.
Figure 26:
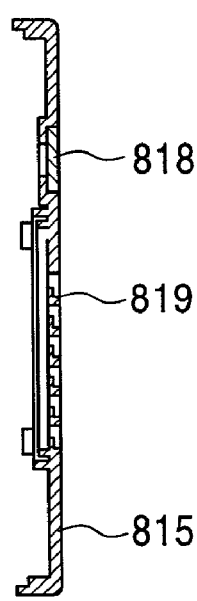
FIG. 26 is a cross-sectional view of the panel case, taken along line XXVI—XXVI of FIG. 24.
Figure 27:
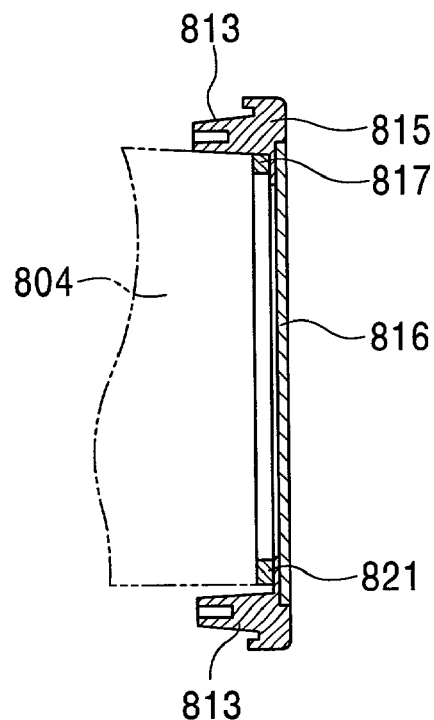
FIG. 27 is a cross-sectional view of the panel case, taken along line XXVII—XXVII of FIG. 24.

The main part 801 of the POP advertising unit 800 includes an LCD module 804 disposed on the front side for displaying an image, a memory stick slot 806 formed in a corner on the top side for receiving a plate-shaped semiconductor memory (memory stick) 805 serving as an advertisement medium capable of storing a plurality of POP advertisement files, and terminal connectors 809 and 810 disposed, as shown in FIG. 23, in a corner on the bottom side, for receiving terminals of a power cable 807 and a signal cable (AV cable) 808. Although not shown, the main part 801 also includes a controller such as a microcomputer (FIG. 10) disposed inside the main part 801.

Figure 22:
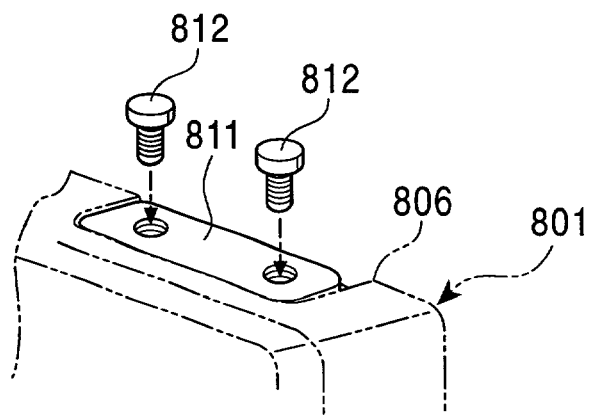
FIG. 22 is an enlarged partial view illustrating a memory stick slot formed in the electronic POP advertising apparatus.

As shown in FIG. 22, after the memory stick 805 (FIG. 20) is inserted into the memory stick slot 806, the opening of the memory stick slot 806 is covered with a lid 811, and the lid 811 is fastened by screws 812. This prevents the memory stick 805 from being easily removed from the main part 801 placed together with articles to be sold. This prevents the memory stick 805 from being tampered or stolen.

Depending upon the location where the main part of the electronic advertising unit 800 is placed, the LCD module 804 is often seen by persons, who are often walking, from an oblique direction at an angle with respect to the direction normal to the screen plane. In order to provide sufficiently high image quality when being seen from an oblique direction, the LCD having a screen which is longer in a horizontal direction has a wide viewing angle range from an angle 60° tilted upward from a direction normal to the screen to 40° downward, and from 55° leftward to 55° rightward. The screen is capable of withstanding a mechanical shock as large as 100 G. In usual specifications of LCDs, maximum the viewing angle seen from downward is greater than the maximum viewing angle seen from the upward. However, in practical applications of POP advertisements, the LCD module is more likely to be placed such that it is seen from upward than to be placed at a large height such that it cannot be reached by a hand and it is seen from downward. For this reason, the LCD module is assembled upside down.

As shown in FIGS. 24 to 29, the panel case 802 is constructed into the form of a rectangular which is longer in a horizontal direction, and includes a hook 813, which is fitted with the main part 801 of the POP advertisement unit, disposed on the back side of the panel case 802, a case frame 815 having an opening 814 formed in the center and having a size which fits with the liquid crystal screen of a LCD module 804, a transparent plate 816 which is fitted in the opening 814 by means of pressing, and an LCD holder 817 disposed at the rear of the transparent plate 816 and adhered by means of pressing, for holding the liquid crystal screen of the LCD module 804.

The case frame 815 includes a remote control signal receiver frame 818 formed at a side of the opening 814, for receiving a remote control signal ray, and also includes an audio output grating 819 disposed at a lower side of the remote control signal receiver frame 818 so that a voice or sound is output via the audio output grating 819.

Figure 28:
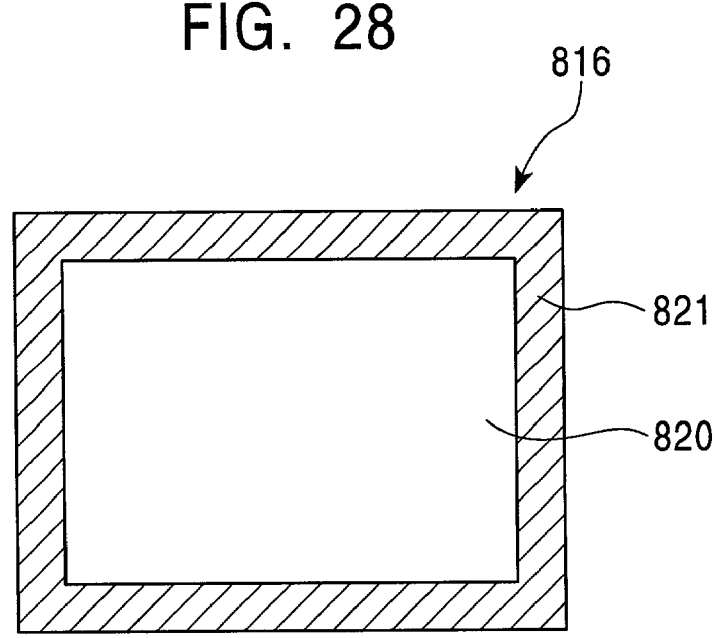
FIG. 28 is a plan view of a transparent LCD plate.
Figure 29:
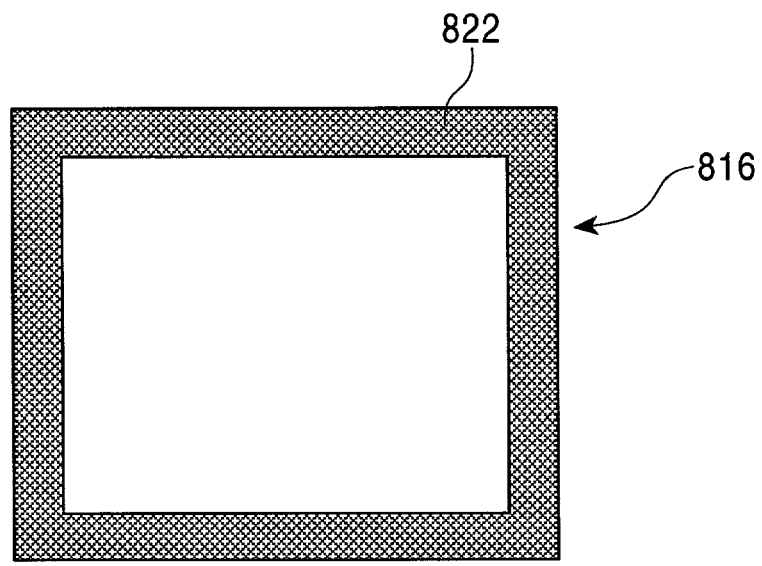
FIG. 29 is a back view of a the transparent LCD plate.

The transparent plate 816 includes, as shown in FIGS. 28 and 29, a transparent basic plate 820 having a size equal to the size of the liquid crystal screen of the LCD module 804, a decorative frame 821 with a particular width disposed around the transparent basic plate 820, and a bonding part disposed on the back side of the decorative frame 821, for bonding the transparent LCD plate 816 with the case frame 815.

The panel case 802 having the above structure is assembled by attaching the transparent LCD plate 816 to the case frame 815 from the front side of the case frame 815 and then attaching the LCD holder 817 at the rear of the LCD. The assembled panel case 802 is fitted in the main part 801 from the front side thereof, and thus a complete POP advertising unit 800 is obtained. The structure of the POP advertising unit is designed such that a space is formed between the transparent LCD plate 816 of the assembled panel case 802 and the liquid crystal screen of the LCD module 804 thereby absorbing a mechanical shock directly applied to the liquid crystal screen and also providing a drip proof capability.

Figure 30:
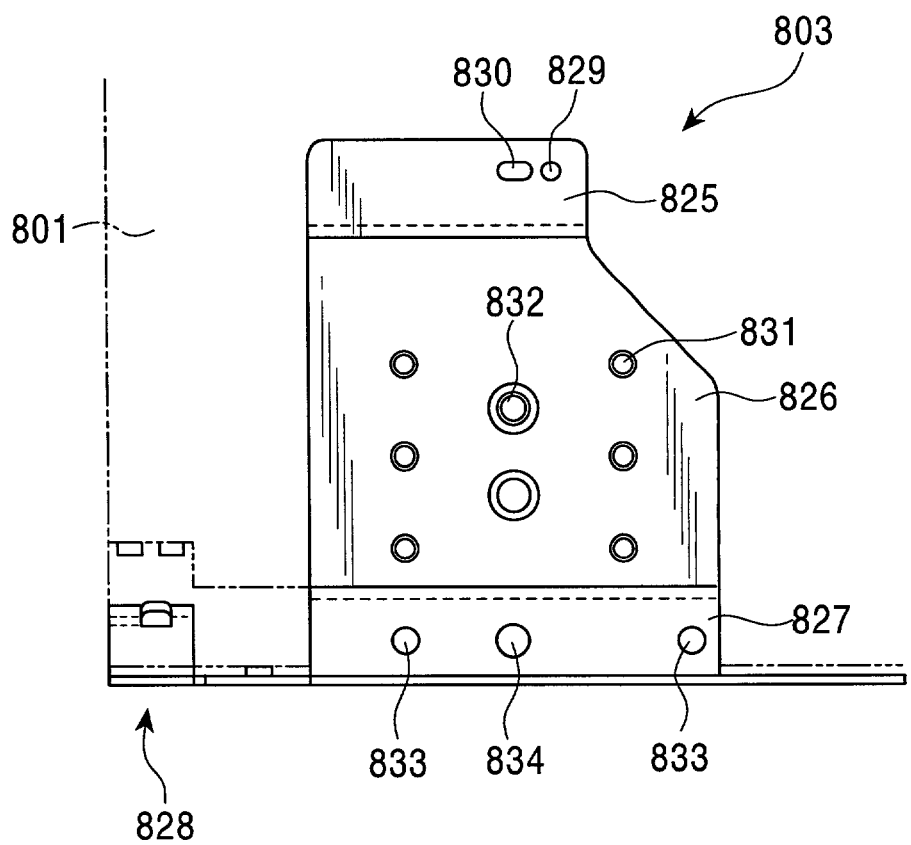
FIG. 30 is a plan view of a fixing member.
Figure 31:
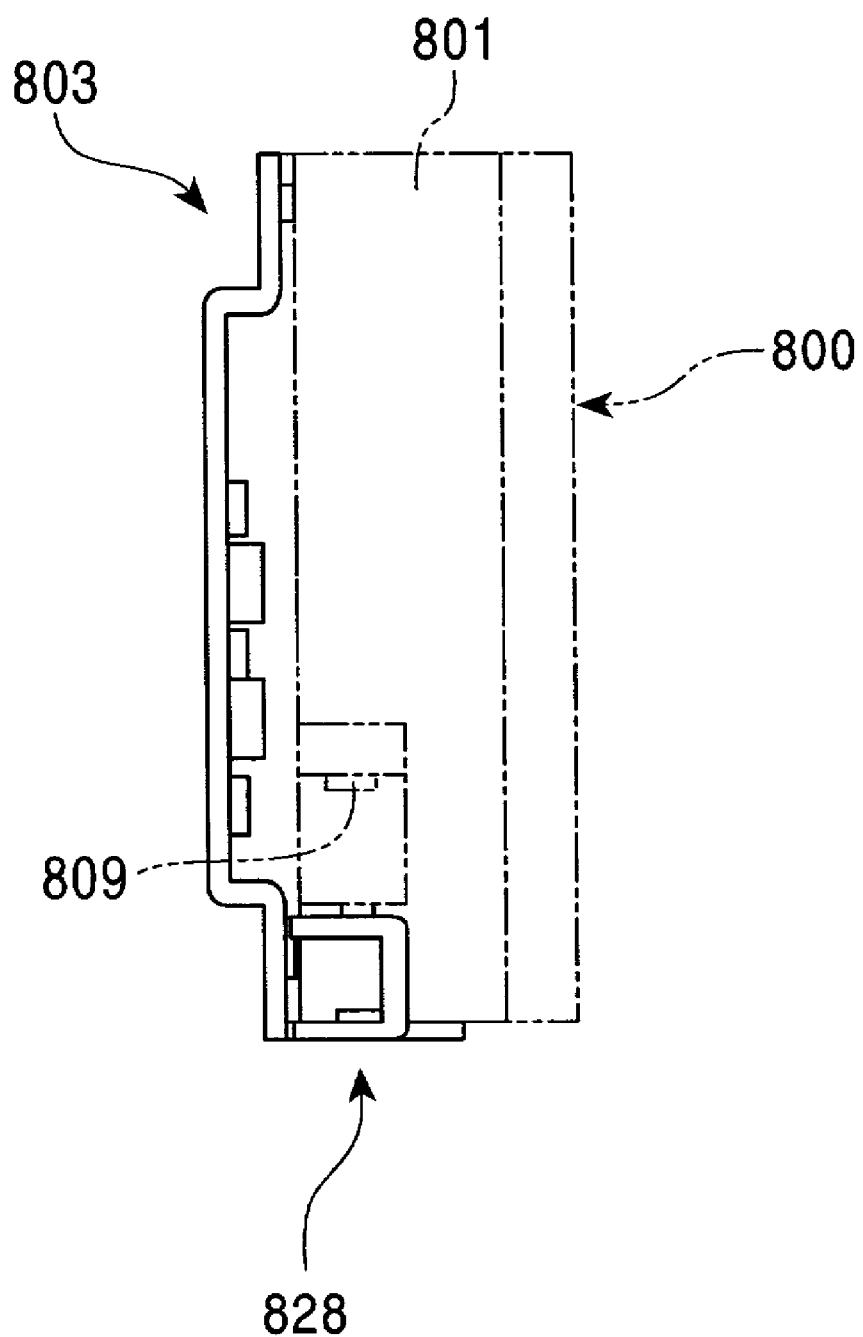
FIG. 31 is a side view of the fixing member seen from a side where a terminal removal protection part is disposed.

As shown in FIGS. 30 and 31, the fixing member 803 is formed of a plate-shaped member and has an upper plate member including an upper main-part fixing part 825 connected to the main part 801 of the POP advertising unit, an external fixing part 826 extending from the upper main-part fixing part 825 and bent outward into a C-like shape in cross section, a lower main-part fixing part 827 extending from the external fixing part 826 and connected to the main part 801 of the POP advertising unit, and a terminal removal protection part 828 extending from the lower main-part fixing part 827.

The upper main-part fixing part 825 has a screw hole 829 through which a screw is inserted to fix the fixing member 803 to the main part 801 of the POP advertising unit, and also has an adjusting hole 830. The outer fixing part 826 is formed such that when it is attached to the main part 801 of the POP advertising unit, a space is formed between them. This space allows screws to be inserted into holes after the fixing member 803 has been fixed to the main part 801 of the POP advertising unit. A flat portion of the outer fixing part 826 has fixing holes 831 and a hole 832 used to fix the fixing member 803 to a tripod. The lower main-part fixing part 827 has, as with the upper main-part fixing part 825, screw holes 833 through which screws are inserted to fix the fixing member 803 to the main part 801 of the POP advertising unit, and also has a guide 834.

The terminal removal protection part 828 is formed by bending a plate material into a C-like shape and is connected to the lower main-part fixing part 827. When being assembled, the top portion thereof comes to a position facing the terminal connectors 809 and 810 of the main part 801 of the POP advertising unit so that terminals of the power cable 807 and the signal cable 808 connected to the terminal connectors 809 and 810 cannot be disconnected.

If the fixing member 803 has been attached to the electronic advertising unit 800 after connecting the terminals of the power cable 807 and the signal cable 808 to the respective terminal connectors 809 and 810, the terminals of the cables 807 and 808 cannot be removed unless the fixing member 803 is removed. This prevents a problem due to removal of the terminals.

As can be understood from the above description, the information playback apparatus according to the present invention has great advantages. That is, the use of the plate-shaped storage medium makes it possible to achieve a reduction in the size of the information playback apparatus. Furthermore, the use of the plate-shaped storage medium makes it possible to play back a moving image repeatedly without causing degradation in the data stored therein, because the data is electrically stored in the plate-shaped storage medium. The information playback apparatus can be used to form an electronic POP apparatus which has no moving mechanism and which thus encounters no degradation in the mechanism. This allows a reduction in maintenance cost. Furthermore, the electronic POP apparatus can be installed in a small space.

The use of the plate-shaped storage medium makes it possible to realize an apparatus having excellent portability.

The control program of the apparatus can be updated using the plate-shaped storage medium. This makes it possible to upgrade the version of the control program and fix a bug after shipping the apparatus, without disassembling the apparatus.

Furthermore, using a control program stored in the plate-shaped storage medium, it is possible to execute a control command which is not originally included in the apparatus thereby examining the internal control status of the apparatus and displaying the version number on the displaying means by superimposing character data created by the OSD capability.

The playing back operation can be programmed such that a plurality of image data can be played back in an arbitrary desired order. Furthermore, the playing back operation can be performed at an arbitrary desired time using the timer.

Furthermore, a long-time continuous playing back operation is possible by alternately reading data from a plurality of plate-shaped storage media.

The apparatus and the plate-shaped storage medium may be assigned particular identification codes having a one-to-one correspondence so that only a particular user can play back only a particular file.

The electronic POP advertising apparatus according to the present invention is capable of storing a plurality of different POP advertisement files. A POP advertisement properly selected from them is presented when presence of a person is detected. That is, a POP advertisement is timely presented only when it is necessary, and thus a reduction in power consumption is achieved.

The sensor unit for detecting presence of a person may be placed properly apart from the location of the POP advertising unit so that when a person approaching an article is detected, an advertisement is presented in such a manner that the person can easily see and listen to the advertisement. This allows full use of the functions of the POP advertising apparatus.

What is claimed is:

1. An information playback apparatus comprising:
    a nonvolatile memory storage medium, wherein compressed moving image file data are electrically stored in said nonvolatile memory storage medium and said nonvolatile memory storage medium is removably attached to a main unit;
    decompressing means disposed in said main unit for reading and for decompressing said compressed moving image file data;
    conversion means disposed in said main unit for converting playback image data obtained by decompressing said moving image file data into image data in an NTSC format;
    displaying means disposed within said main unit for displaying said image data in said NTSC format in a predetermined display area; and
    controlling means for repeatedly playing said image data in predetermined units of said compressed moving image file data,
    wherein said storage medium stores a control program for controlling operation of said main unit so that a control program installed in said main unit may be updated.

2. The information playback apparatus according to claim 1, wherein said main unit displays an operation status on said displaying means by executing said control program installed in said main unit.

3. The information playback apparatus according to claim 2, wherein said display of said operation status is performed by superimposing particular character data upon said image data.

4. The information playback apparatus according to claim 1, wherein said main unit executes a control command not originally included in said main unit by executing said control program stored in said storage medium.

5. The information processing apparatus according to claim 1, further comprising setting means for setting an order in which a plurality of said image data are played, wherein said plurality of image data are played back in said order.

6. The information processing apparatus according to claim 1, further comprising timer setting means for setting a starting time and an ending time when said playing of said image data is started and ended, wherein said image data is played in a period defined by said starting and said ending times.

7. The information processing apparatus according to claim 1, further comprising temporary storing means for temporarily storing said compressed moving image file data, wherein said compressed moving image data is read from said storage medium in real time and temporarily stored in said temporary storing means so that said image data is played in real time.

8. The information processing apparatus according to claim 1, further comprising a speaker disposed at one of on said main unit and outside said main unit for reproducing audio data, wherein
    said storage medium electrically stores compressed audio file data;
    said decompressing means reads and decompresses said compressed audio file data; and
    said conversion means converts said decompressed audio data into audio data in a predetermined format.

9. The information processing apparatus according to claim 1, wherein a plurality of said storage media are removably attached to said main unit, and compressed image file data stored in said plurality of storage media are sequentially read to continuously play said image data.

10. The information processing apparatus according to claim 1, wherein:
- said compressed image file data includes a describing area in which a storage medium identification code is described;
- said control means includes storage means in which a main unit identification code is stored; and
- said compressed moving image file data is read from said storage medium and played back when said storage medium identification code and said main unit identification code are consistent.

11. The information playback apparatus according to claim 10, wherein said main unit identification code is rewritable.

12. The information playback apparatus according to claim 11, wherein rewriting of said main unit identification code is performed using said storage medium attached to said main unit.

13. The information playback apparatus according to claim 11, wherein rewriting of said main unit identification code is performed using a switch coupled with said storage means in which said main unit identification code is stored.

* * * * *

UNITED STATES PATENT AND TRADEMARK OFFICE
CERTIFICATE OF CORRECTION

PATENT NO. : 7,099,568 B2
APPLICATION NO. : 09/810014
DATED : August 29, 2006
INVENTOR(S) : Yoshio Ochiai, Yasufumi Shinagawa and Koji Saito It is certified that error appears in the above-identified patent and that said Letters Patent is hereby corrected as shown below:

Title Page, Item (75) Inventors: the third named inventor should read --Koji-- not "Koni"

Signed and Sealed this

Twenty-ninth Day of May, 2007

JON W. DUDAS
*Director of the United States Patent and Trademark Office*